US010104299B2

(12) United States Patent
Tsubusaki

(10) Patent No.: US 10,104,299 B2
(45) Date of Patent: Oct. 16, 2018

(54) ZOOM CONTROL APPARATUS, ZOOM CONTROL METHOD, AND STORAGE MEDIUM

(71) Applicant: CANON KABUSHIKI KAISHA, Tokyo (JP)

(72) Inventor: Akihiro Tsubusaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/796,786

(22) Filed: Jul. 10, 2015

(65) Prior Publication Data

US 2016/0021316 A1 Jan. 21, 2016

(30) Foreign Application Priority Data

Jul. 16, 2014 (JP) .................. 2014-146015

(51) Int. Cl.
*H04N 5/262* (2006.01)
*H04N 5/232* (2006.01)

(52) U.S. Cl.
CPC ..... *H04N 5/23296* (2013.01); *H04N 5/23219* (2013.01)

(58) Field of Classification Search
CPC ................ H04N 5/23296; H04N 5/23219
USPC ................ 348/240.99, 240.1–240.3
See application file for complete search history.

(56) References Cited

U.S. PATENT DOCUMENTS

| 8,319,883 B2 | 11/2012 | Hada | |
| 8,634,000 B2* | 1/2014 | Ishikawa | H04N 5/23296 348/240.3 |
| 2005/0074185 A1* | 4/2005 | Jung | H04N 5/232 382/298 |
| 2014/0307147 A1* | 10/2014 | Hanzawa | H04N 5/23296 348/333.12 |

FOREIGN PATENT DOCUMENTS

| CN | 101489037 A | 7/2009 |
| CN | 102281398 A | 12/2011 |
| CN | 104104863 A | 10/2014 |
| JP | 2007-251429 A | 9/2007 |
| JP | 2011-259285 A | 12/2011 |
| JP | 2012-95019 A | 5/2012 |

* cited by examiner

*Primary Examiner* — Yogesh Aggarwal
(74) *Attorney, Agent, or Firm* — Canon U.S.A., Inc. IP Division

(57) ABSTRACT

An apparatus includes a control unit configured to perform zoom control based on a size of an object indicated by acquired information and a set reference size. In the zoom control, the control unit switches between first control and second control according to the set reference size. In the first control, a zoom speed to be set is updated in such a way as to gradually increase, and, in the second control, a zoom speed to be set is not updated.

29 Claims, 15 Drawing Sheets

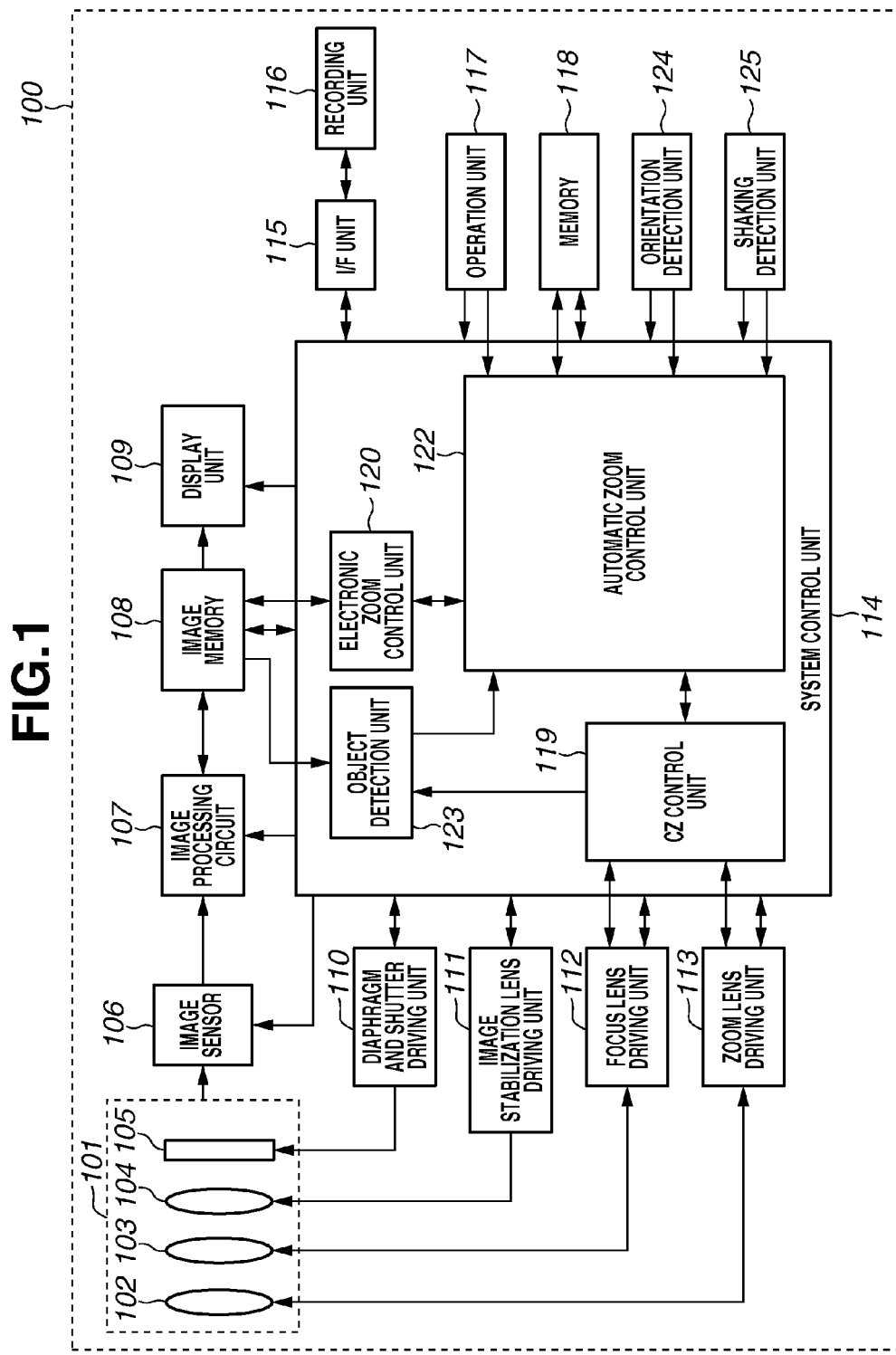

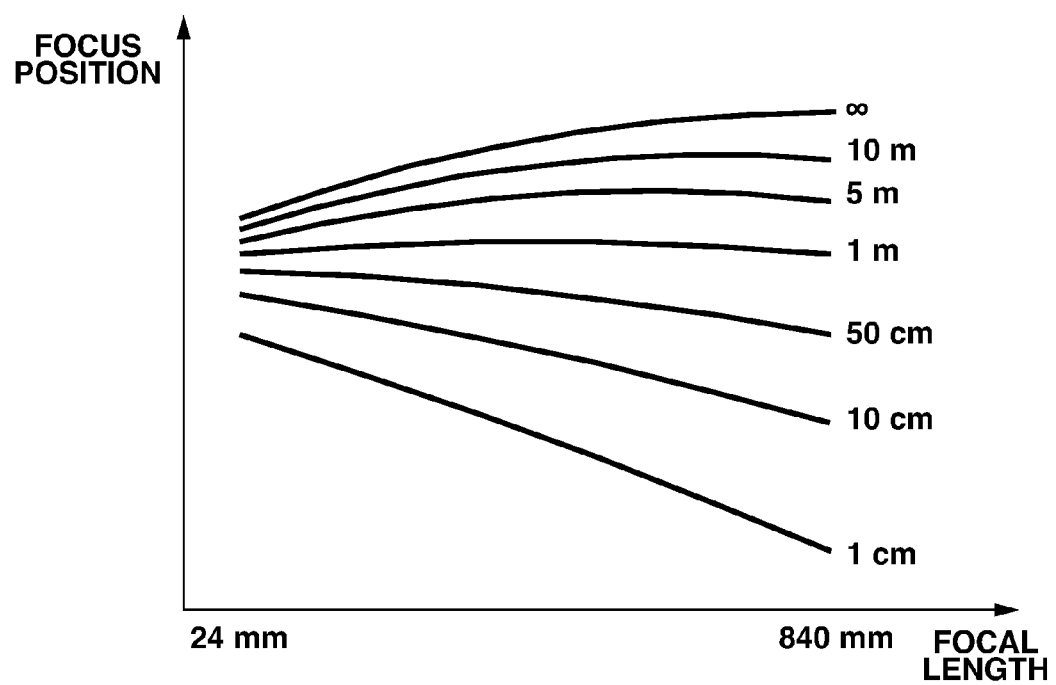

ZOOM-OUT REGION (ZO)

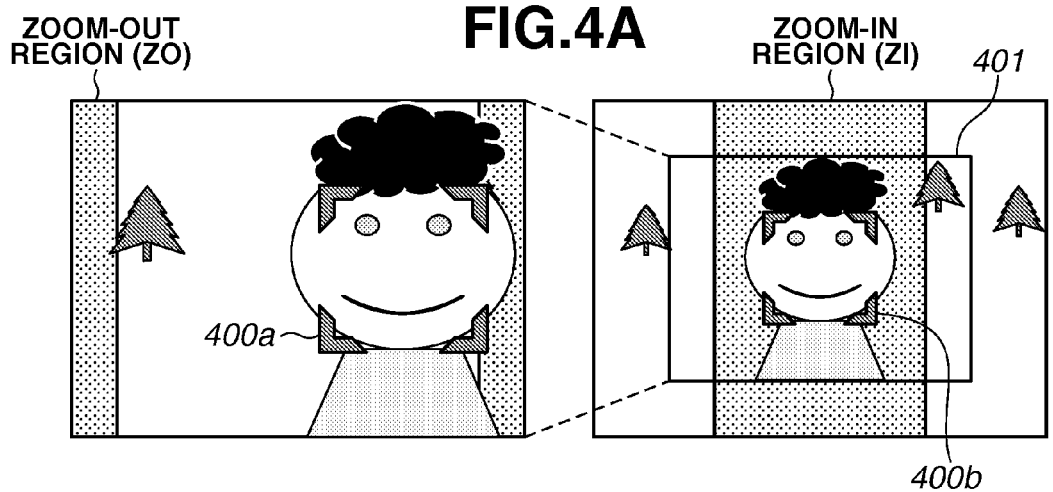
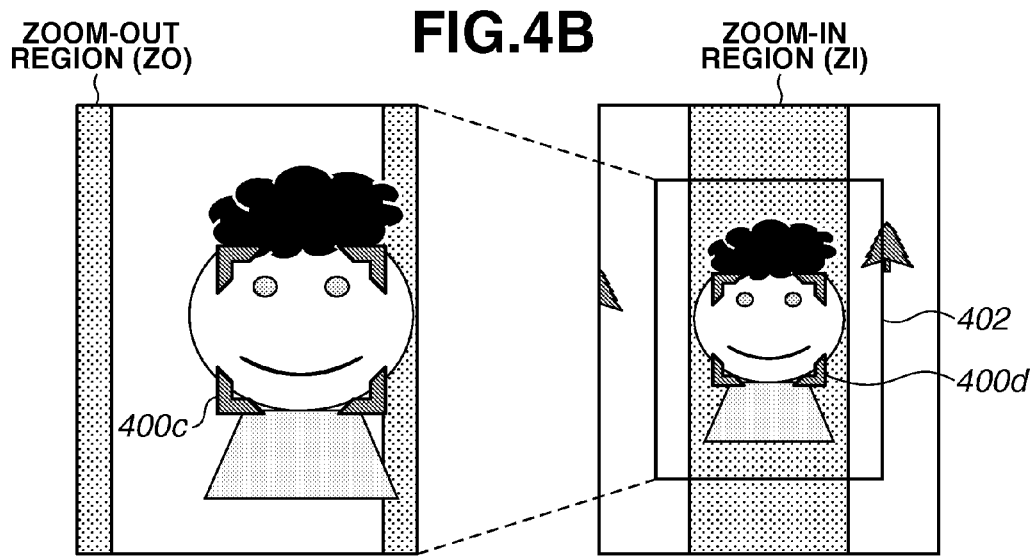
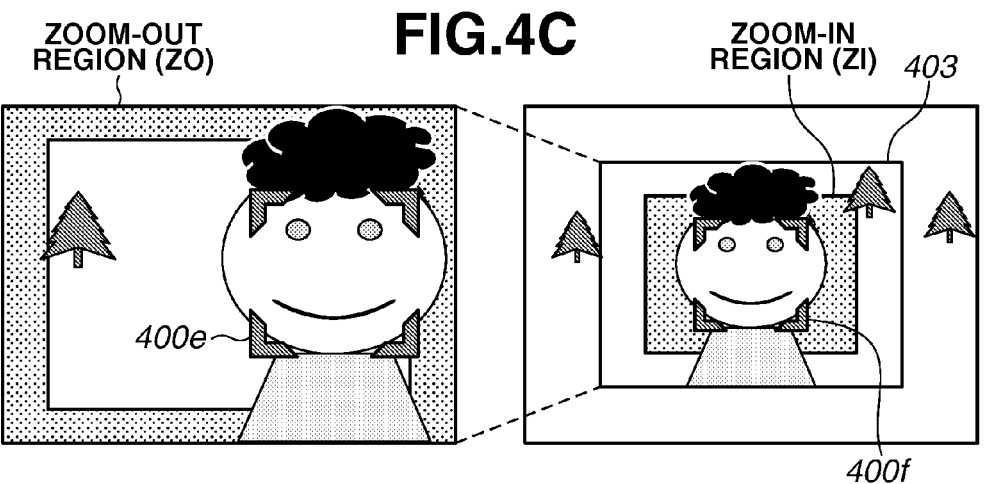

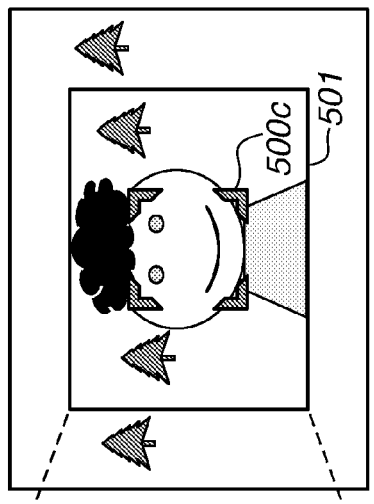
FIG.5A
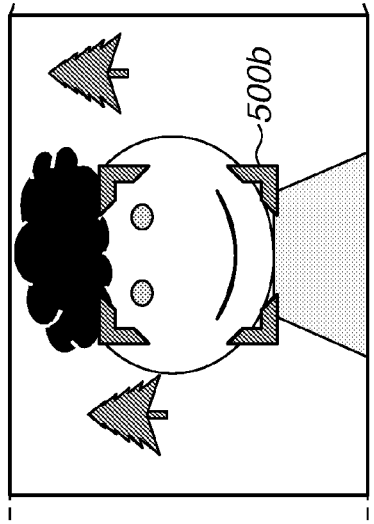
FIG.5B
FIG.5C
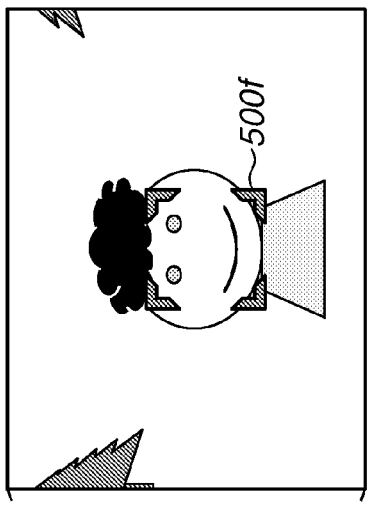
FIG.5D
FIG.5E
FIG.5F

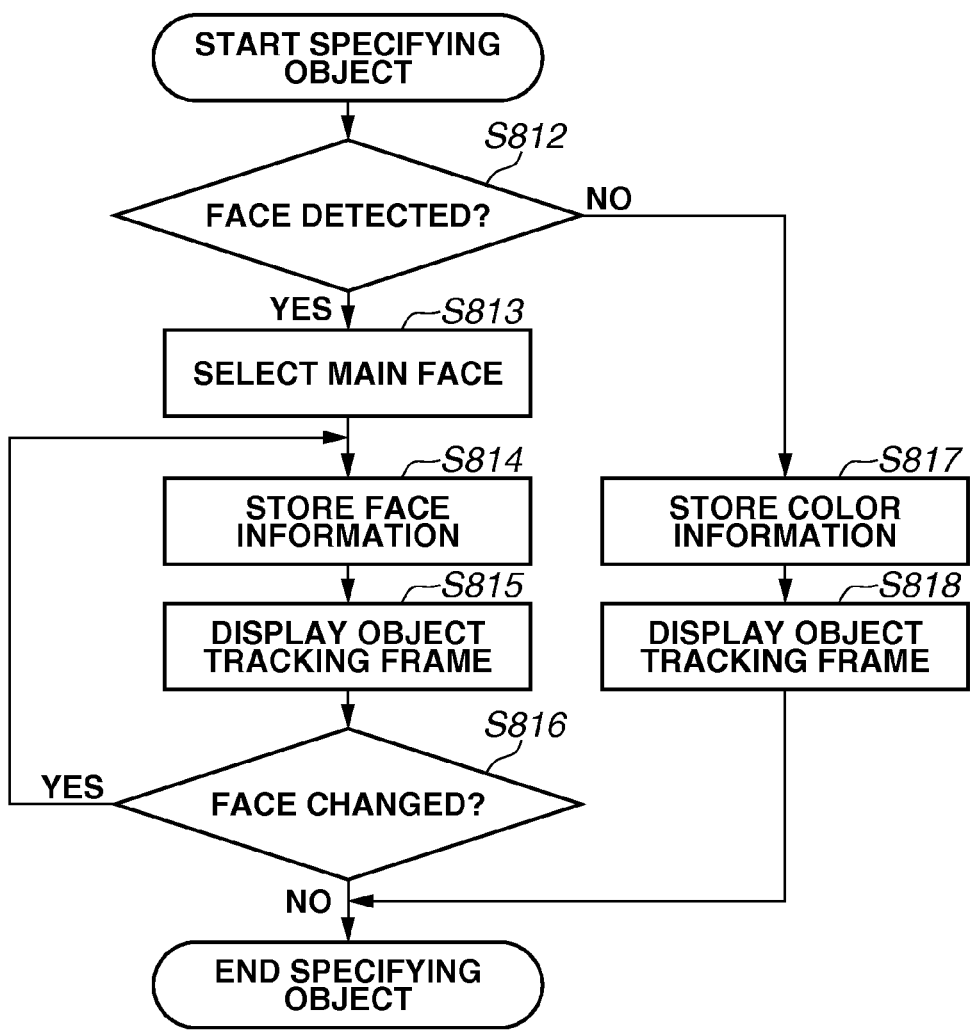

ZOOM CONTROL APPARATUS, ZOOM CONTROL METHOD, AND STORAGE MEDIUM

BACKGROUND OF THE INVENTION

Field of the Invention

The present invention relates to a zoom control apparatus and a zoom control method for controlling a zoom operation.

Description of the Related Art

Conventionally, there have been known imaging apparatuses having both the function of performing an optical variable magnification (optical zoom) by driving a zoom lens and the function of performing an electronic variable magnification (electronic zoom) by enlarging a part of a captured image. There have also been known imaging apparatuses having an automatic zoom function, which automatically changes a zoom position according to information detected from an object (subject).

Japanese Patent Application Laid-Open No. 2012-95019 discusses the configuration of a camera equipped with an automatic zoom function which keeps the size of an object image constant. Japanese Patent Application Laid-Open No. 2012-95019 also discusses a method in which the user, when using the automatic zoom function, is allowed to select a composition pattern from among a plurality of options, such as "face close-up", "upper-body close-up", and "whole body". The automatic zoom control, which maintains the size of an object image, determines the size of an object image, which serves as a benchmark for zoom control, based on the selected composition pattern. For example, when "whole body" is selected, a zoom operation is performed in such a way as to cause the whole-body image of a person serving as an object to be set in a shooting image plane.

Furthermore, Japanese Patent Application Laid-Open No. 2011-259285 discusses the setting of a zoom speed that can be set to make an object unlikely to move to outside the frame in an automatic zoom function. Japanese Patent Application Laid-Open No. 2011-259285 also discusses decreasing the zoom speed in a case where the distance from the center of an image plane to an object within the image plane is long or in a case where the size of an object within the image plane is large.

However, in the case of Japanese Patent Application Laid-Open No. 2011-259285, only the position of an object within the image plane is taken into consideration in the setting of a zoom speed. Therefore, in the method for setting a zoom speed discussed in Japanese Patent Application Laid-Open No. 2011-259285, in a case where the automatic zoom is performed based on a composition as discussed in Japanese Patent Application Laid-Open No. 2012-95019, an object may become likely to move to outside the frame depending on the selected composition.

SUMMARY OF THE INVENTION

According to an aspect of the present invention, an apparatus includes an acquisition unit configured to acquire information about a size of an object detected from an image, a setting unit configured to set a reference size of an object for zoom control, and a control unit configured to perform the zoom control based on the size of the object indicated by the acquired information and the set reference size, wherein, in the zoom control, the control unit switches between first control and second control according to the set reference size, and wherein, in the first control, a zoom speed to be set is updated in such a way as to gradually increase, and, in the second control, a zoom speed to be set is not updated.

Further features of the present invention will become apparent from the following description of exemplary embodiments with reference to the attached drawings.

BRIEF DESCRIPTION OF THE DRAWINGS

FIG. 1 is a block diagram illustrating a configuration example of a digital camera according to an exemplary embodiment of the present invention.

FIG. 2 illustrates an example of a relationship between the focal length and the position of a focus lens for each object distance.

FIGS. 4A, 4B, and 4C illustrate processing for preventing an object (person) from moving to outside an image plane (frame).

FIGS. 5A, 5B, 5C, 5D, 5E, and 5F illustrate processing for preventing the size of an object (person) from changing within an image plane.

FIGS. 8A, 8B, and 8C are flowcharts illustrating processing for specifying an object.

DESCRIPTION OF THE EMBODIMENTS

Figure 3A:
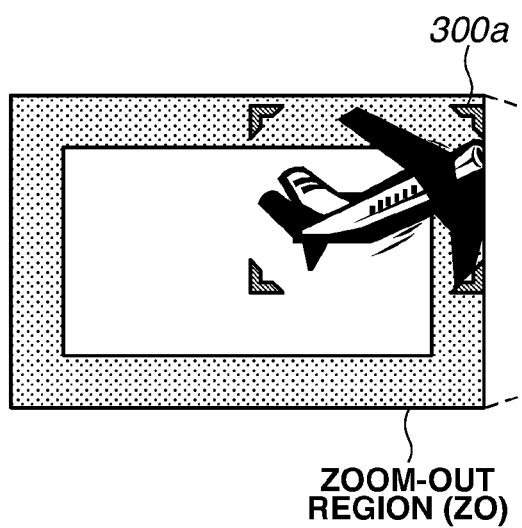
FIGS. 3A and 3B illustrate processing for preventing an object (thing) from moving to outside an image plane (frame).

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Various exemplary embodiments, features, and aspects of the invention will be described in detail below with reference to the drawings. FIG. 1 is a block diagram illustrating a configuration example of a digital camera 100, which is an example of an imaging apparatus equipped with a zoom control apparatus according to the present exemplary embodiment. The digital camera 100 is configured to be able to perform an automatic zoom function.

A lens barrel 101 holds therein lens units. A zoom lens 102 is movable along an optical axis to adjust the focal length, thus optically changing the angle of field (moving the zoom position). A focus lens 103 is movable along the optical axis to adjust focus. An image stabilization lens 104 is a correction lens for correcting blurring of an image caused by camera shake. A diaphragm and shutter 105 is configured to adjust the amount of light, which is used for exposure control. In the present exemplary embodiment, the digital camera 100 is an imaging apparatus integrally composed of the lens barrel 101 and the camera body. However, this is not restrictive. The present exemplary embodiment can be applied to an imaging system that includes a camera body and an interchangeable lens detachably attached to the camera body.

Light having passed through the lens barrel 101 is received by an image sensor 106, which includes a charge-coupled device (CCD) sensor or a complementary metal-oxide semiconductor (CMOS) sensor. The image sensor 106 performs photoelectric conversion to convert an object image into an electrical signal, this generating a captured image signal. The captured image signal is input to an image processing circuit 107. The image processing circuit 107 performs various processing operations, such as pixel interpolation processing and color conversion processing, on the input captured image signal, and outputs image data (image data subjected to the various processing operations) to an image memory 108. The image memory 108 is a storage unit, which includes a dynamic random access memory (DRAM) or a static Random access memory (SRAM).

A display unit 109, which includes a thin-film transistor (TFT) driving type liquid crystal display (LCD), displays a captured image (image data). The display unit 109 also displays specific information (for example, shooting information) as well as the captured image. Such displaying of information for live view can implement an electronic viewfinder (EVF) function for allowing the operator (user) to adjust the angle of field.

A diaphragm and shutter driving unit 110 computes exposure control values (aperture value and shutter speed) based on luminance information acquired with image processing by the image processing circuit 107, and drives the diaphragm and shutter 105 based on a result of the computation. This enables automatic exposure (AE) control. An image stabilization lens driving unit 111 computes the amount of shaking applied to the digital camera 100 based on information from an angular velocity sensor, such as a gyro sensor, and drives the image stabilization lens 104 in such a way as to cancel (reduce) the computed amount of shaking.

A focus lens driving unit 112 drives the focus lens 103. In the present exemplary embodiment, the digital camera 100 performs automatic focusing (AF) control using a contrast method. Therefore, the focus lens driving unit 112 drives the focus lens 103 in such a way as to focus on an object based on focus adjustment information (contrast evaluation value) for a photographic optical system acquired with image processing by the image processing circuit 107. However, this is not restrictive. In the present exemplary embodiment, the digital camera 100 may be configured to perform AF control other than the contrast method, such as a phase-difference AF method, or AF control using a plurality of methods, such as a combination of the contrast method and another method.

A zoom lens driving unit 113 drives the zoom lens 102 according to a zoom operation instruction. An operation unit 117 is configured to include a zoom lever or a zoom button serving as a zoom operation member used to allow the operator to instruct the digital camera 100 to perform zooming. A system control unit 114 detects the amount of operation and the direction of operation of the zoom operation member, which is used for the zoom operation instruction, computes the zoom driving speed and driving direction based on the detected amount and direction, and drives the zoom lens 102 along the optical axis according to a result of the computation.

Image data generated by the image capturing operation is sent to a recording unit 116 via an interface unit (hereinafter referred to as an "I/F unit") 115, and is then recorded on the recording unit 116. The image data is recorded on an external recording medium, such as a memory card, attached to the digital camera 100 (the recording unit 116) or a non-volatile memory 118 built in the digital camera 100, or is recorded on both of the external recording medium and the non-volatile memory 118.

The operation unit 117 includes, in addition to the above-mentioned zoom operation member, a release switch for issuing an instruction to start shooting and an automatic zoom operation switch for issuing an instruction to start or end the automatic zoom function. A signal output from the operation unit 117 is sent to the system control unit 114, which is described below. The memory 118 stores, in addition to program data and image data, setting information of the digital camera 100 and information in the automatic zoom function, such as a zoom-in position, which is described below.

The system control unit 114, which includes a computation unit, such as a central processing unit (CPU), controls the whole digital camera 100 by sending a control instruction to each unit according to an operation of the operator. The system control unit 114 executes various control programs stored in the memory 118, such as programs for performing control of the image sensor 106, AE/AF control, and zoom control (including automatic zoom processing).

To maintain an in-focus state at the time of changing the angle of field by optical zoom, in the case of a rear-focus type lens barrel, such as the lens barrel 101, the focus lens 103 is to be moved to an appropriate focus position according to the position of the zoom lens 102. Such control is referred to as "computer zoom (CZ) control". FIG. 2 illustrates the relationship between the focal length of the zoom lens 102 and the focus position for each object distance. In FIG. 2, the relationship between the focal length of the zoom lens 102 and the focus position in which an in-focus state is obtained is graphed as a data table for each distance to an object. In the present exemplary embodiment, this data table is referred to as a "focus cam table". In FIG. 2, the abscissa axis indicates the focal length corresponding to the zoom position, and the ordinate axis indicates the focus position. At the side of each graph line, a distance from the digital camera 100 to an object (object distance) is indicated.

The system control unit 114 performs a scan operation during AF control by controlling the focus lens driving unit 112 to move the focus lens 103 within a predetermined range. Then, the system control unit 114 detects a focus position serving as an in-focus position by a known method using a contrast evaluation value acquired during the scan operation. The system control unit 114 can measure an object distance by referring to the focus cam table using the current zoom position and the detected focus position.

Next, control associated with the automatic zoom function in the system control unit 114 is described. As illustrated in FIG. 1, the system control unit 114 includes a CZ control unit 119, an electronic zoom control unit 120, an automatic zoom control unit 122, and an object detection unit 123.

The digital camera 100 according to the present exemplary embodiment has an optical zoom function and an electronic zoom function. The CZ control unit 119 and the zoom lens driving unit 113 perform optical zoom. The CZ control unit 119 detects the zoom position of the zoom lens 102 at intervals of a predetermined control period during a zoom operation. Then, the CZ control unit 119 causes the focus lens driving unit 112 to drive the focus lens 103 in such a way as to follow the focus cam table for an object distance measured by AF control corresponding to the detected zoom position. This enables performing an optical zoom operation while keeping an in-focus state.

On the other hand, the electronic zoom control unit 120 and the image memory 108 perform electronic zoom. The electronic zoom control unit 120 implements an electronic zoom function by clipping a target region from image data transferred to the image memory 108. Furthermore, the electronic zoom control unit 120 implements smooth electronic zoom display by displaying the clipped region on the display unit 109 while gradually broadening the clipped region at a frame rate of images captured by the image sensor 106.

The object detection unit 123 detects a desired object region from image data stored in the image memory 108. In the present exemplary embodiment, an object detection method for detecting an object (face or thing) based on face information or color information included in the image data (face detection processing or color detection processing) is described below.

The face detection processing detects a face region existing within image data by a known algorithm. For example, the object detection unit 123 extracts a feature amount from a partial region of the square shape on the image data, and compares the extracted feature amount with a face feature amount, which has previously been prepared. Then, when the correlation between the extracted feature amount and the face feature amount exceeds a predetermined threshold value, the object detection unit 123 determines that the partial region is a face region. The object detection unit 123 repeats this determination while changing a combination of the size, location position, and location angle of the partial region, thus detecting various face regions existing within the image data.

The color detection processing stores, as a feature color, color information of an object region specified according to an object specifying method, which is described below. The color detection processing is executed in a case where an object serving as a detection target is a thing (an object other than persons). The color information includes RGB signals, a luminance signal Y, or color-difference signals R-Y and B-Y, which are output from the image processing circuit 107. During the object detection, the object detection unit 123 divides image data into a plurality of partial regions, and calculates average values of luminance values and color-difference values for each partial region. Furthermore, the object detection unit 123 compares the previously stored feature color information with color information of each region obtained at the time of object detection, and sets a partial region for which differences of luminance values and color-difference values are not greater than respective predetermined amounts, as an object region candidate. Then, the object detection unit 123 sets a set of partial regions adjacent the object region candidate, as the same color region, and sets a region in which the same color region falls within a predetermined size range, as a final object region.

The object detection unit 123 is able to estimate the size of an object region on image data by using not only face information and color information but also object distance information measured by the CZ control unit 119 and focal length information of the zoom lens 102.

An orientation detection unit 124 detects the orientation (normal position, grip up, or grip down) of the digital camera 100 based on information acquired from an acceleration sensor. A shaking detection unit 125 detects the shaking state of the digital camera 100 based on information acquired from a gyro sensor or the like. The shaking detection unit 125 detects that the digital camera 100 is in a hand-held state, if the amount of shaking applied to the gyro sensor or the like is equal to or greater than a predetermined amount, and detects that the digital camera 100 is in the state of being fixed to a tripod or the like, if the amount of shaking applied to the gyro sensor or the like is less than the predetermined amount. The acceleration sensor and the gyro sensor, which are used for orientation detection and shaking detection, may be used also as a sensor used to acquire control information for the image stabilization lens driving unit 111.

Next, the outline of the automatic zoom function and the automatic zoom control unit 122 are described. The digital camera 100 according to the present exemplary embodiment has the automatic zoom function. In the case of a camera unequipped with the automatic zoom function, if an object moves to outside the frame while the operator is waiting for a photo opportunity with framing in a telephoto state, the operator is to perform the following operation. First, the operator performs a zoom out operation by operating a zoom operation member and then searches for the object. Then, after searching for the object, the operator performs a zoom operation to re-adjust the angle of field up to a desired angle of field. Furthermore, also in a case where the object moves and the size of the object image changes, the operator is to adjust the size of the object image by operating the zoom operation member.

On the other hand, in the case of a camera equipped with the automatic zoom function, the operator sets the automatic zoom function and then to specify an object, an image of which the operator intends to capture, by performing an operation for specifying the object via a touch panel or the like. When the automatic zoom function has been set, a zoom operation is automatically performed in such a way as to set the specified object in a predetermined size in the vicinity of the center of an image. The method for specifying an object includes, besides the touch panel operation, a method for specifying an object lying in the vicinity of the center when a particular button is pressed and a method for allowing the camera to automatically select a main object from among the detected objects.

The object detection unit 123 calculates the position or size of the specified object region on image data from the image memory 108. Continuously performing this calculation on image data at every sampling displayed as a live view enables tracking the motion of an object. In a case where an object being tracked has been detected at a zoom-out region, which is described below, or in a case where the detected object image has become larger than a predetermined size, the automatic zoom control unit 122 instructs the CZ control unit 119 or the electronic zoom control unit 120 to perform a zoom-out operation toward the wide-angle direction. In a case where an object has been detected within a zoom-in region in an automatic zoom frame 301 (FIG. 3B) and has been set in a predetermined size range, the automatic zoom control unit 122 instructs the CZ control unit 119 or the electronic zoom control unit 120 to perform a zoom-in operation up to a zoom position at the telephoto side indicated by the automatic zoom frame 301. According to this processing, the operator moves the camera in such a way as to set the object in an image plane without regard to a zoom operation. Even if an object is about to move to outside the frame, the zoom position is automatically changed, so that it becomes possible to more easily adjust the angle of field.

Figure 3B:
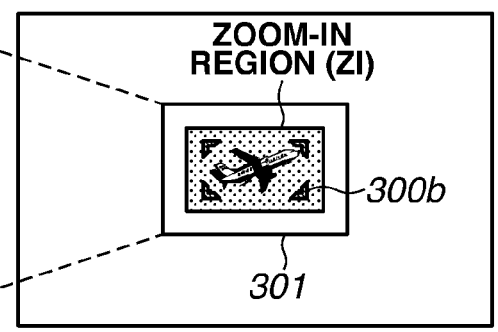

Next, an initiation condition for the zoom-out operation or zoom-in operation is described with reference to FIGS. 3A and 3B to FIGS. 5A, 5B, 5C, 5D, 5E, and 5F. FIGS. 3A and 3B illustrate processing for preventing an object (thing) from moving to outside an image plane (frame). FIGS. 4A, 4B, and 4C illustrate processing for preventing an object (person) from moving to outside an image plane (frame).

In FIGS. 3A and 3B and FIGS. 4A, 4B, and 4C, a frame 300a and a frame 300b are thing tracking frames, which are used to track an object (a thing other than persons), and frames 400a to 400f are face tracking frames, which are used to track an object (the face of a person). In the present exemplary embodiment, in a case where an object is applicable to any of a person and a thing, the thing tracking frame and the face tracking frame may be collectively referred to as an "object tracking frame". The object tracking frame is displayed on the EVF of the display unit 109 in such a way as to surround an object, which has been specified by the operator. The position and size of the object tracking frame on an image plane are calculated by the object detection unit 123 based on face information and color information, and are updated at intervals of the frame rate.

FIGS. 3A and 3B illustrate processing for preventing an object (airplane) from moving to outside an image plane (frame). Referring to FIG. 3A, a region located outside a predetermined percentage of the entire angle of field (the entire image plane) displayed on the EVF is indicated as a zoom-out region ZO. For example, in a case where, with the central point of the image plane set as 0% and the entire image plane set as 100%, the position at which 80% of the entire image plane is located is set as a boundary of the zoom-out region ZO, a region extending from 80% to 100% of the entire image plane becomes the zoom-out region ZO. If a part of the thing tracking frame 300a enters the zoom-out region ZO within the image, the automatic zoom control unit 122 performs control to start a zoom-out operation. Furthermore, the automatic zoom control unit 122 stores, into the memory 118, a zoom position taken before the zoom movement (which corresponds to the zoom-in angle of field). The zoom ratio and zoom speed used during the zoom-out operation are previously set according to the size and movement speed of an object. Furthermore, the zoom ratio and zoom speed may be calculated as appropriate according to the size and movement speed of an object. The zoom-out operation is performed according to the set or calculated zoom magnification and zoom speed. This enables effectively preventing an object to move to outside the frame.

FIG. 3B illustrates an angle of field obtained by zooming out by a predetermined amount from the angle of field illustrated in FIG. 3A. Referring to FIG. 3B, a region located inside a predetermined percentage of the zoom-in angle of field (the angle of field taken before the zoom-out operation) 301 in an object searching state is indicated as a zoom-in region ZI. For example, in a case where, with the central point of the image plane set as 0% and the zoom-in angle of field 301 set as 100%, the position at which 70% of the zoom-in angle of field 301 is located is set as a boundary of the zoom-in region ZI, a region extending from 0% to 70% of the zoom-in angle of field 301 becomes the zoom-in region ZI. In this instance, in a case where the zoom-out magnification is, for example, ½ times, the zoom-in angle of field 301 has a size equivalent to 50% of the entire image plane. Accordingly, the zoom-in region ZI can also be said to be a region extending from 0% to 35% (=70%×(½)) of the entire image plane. When the operator changes the orientation of the digital camera 100 in such a way as to set the thing tracking frame 300b inside the zoom-in region ZI, the automatic zoom control unit 122 performs control to start a zoom-in operation.

FIGS. 4A, 4B, and 4C illustrate processing for preventing an object (person) from moving to outside an image plane (frame). Even in a case where the object is a person, when a part of the face tracking frame enters the zoom-out region ZO, the automatic zoom control unit 122 starts a zoom-out operation, and when the face tracking frame is set inside the zoom-in region ZI, the automatic zoom control unit 122 performs a zoom-in operation. The difference between a case where the object is a person and a case where the object is a thing is that, in a case where the object is a person, since the direction of movement can be estimated to some extent, the zoom-out region ZO and the zoom-in region ZI are set according to a region located in the estimated movement direction.

Moreover, in a case where hand-held shooting is performed, an object may move to outside the frame due to the influence of camera shake or the like. However, in a case where an object has moved to outside the frame due to camera shake, it is possible that the operator performs an operation to move the object to inside the frame, so that the object can be returned to inside the frame. Here, in a case where the zoom-out region ZO is set at the upper portion of the image plane, even when shooting is performed with a person set in the vicinity of the center, the face tracking frame may enter the zoom-out region ZO, so that an unintentional zoom-out operation may be performed. Therefore, in a case where the object is a person and the digital camera 100 is in a hand-held state, in consideration of a framing operation of the operator, the zoom-out region ZO is not allowed to be set at the upper portion of the image plane.

In this way, according to the present exemplary embodiment, in a case where a face is detected by the object detection unit 123, the automatic zoom control unit 122 changes the settings of the zoom-out region ZO and the zoom-in region ZI according to the orientation of the digital camera 100 detected by the orientation detection unit 124 and a result of detection by the shaking detection unit 125. The term "result of detection by the shaking detection unit 125" used herein means a result of detection of whether the digital camera 100 is in a hand-held state.

FIG. 4A illustrates a zoom-out region ZO and a zoom-in region ZI that are set when the digital camera 100 is hand-held in a normal position (in landscape mode). Under such a shooting scene, in a case where the object horizontally moves to outside the frame, the position of the object within the image plane moves in the horizontal direction (in the longitudinal direction) relative to the image plane in the normal position. Therefore, as illustrated in FIG. 4A, the automatic zoom control unit 122 sets the zoom-out region ZO and the zoom-in region ZI in a longitudinal band shape in the vertical direction (the transverse direction) relative to the image plane in the normal position. Then, when the face tracking frame 400a enters the zoom-out region ZO, the automatic zoom control unit 122 determines to start zoom-out and performs a zoom-out operation by a predetermined zoom magnification. Furthermore, when the face tracking frame 400b becomes set inside the zoom-in region ZI, the automatic zoom control unit 122 determines to start zoom-in and performs a zoom-in operation by a predetermined zoom magnification up to a zoom return position 401. Setting the zoom-out region ZO and the zoom-in region ZI in the above-described way enables effectively preventing an object from moving to outside the frame.

FIG. 4B illustrates a zoom-out region ZO and a zoom-in region ZI that are set when the digital camera 100 is held in portrait mode with the grip down or with the grip up. In this case, the automatic zoom control unit 122 locates the zoom-out region ZO and the zoom-in region ZI in a longitudinal band shape in the vertical direction (longitudinal direction) relative to the image plane in the portrait position. Then, when the face tracking frame 400c enters the zoom-out region ZO, the automatic zoom control unit 122 determines to start zoom-out and performs a zoom-out operation by a predetermined zoom magnification. Furthermore, when the face tracking frame 400d becomes set inside the zoom-in region ZI, the automatic zoom control unit 122 determines to start zoom-in and performs a zoom-in operation by a predetermined zoom magnification up to a zoom return position 402. Setting the zoom-out region ZO and the zoom-in region ZI in the above-described way enables detecting the movement of an object in the horizontal direction and effectively preventing the object from moving to outside the frame.

FIG. 4C illustrates a zoom-out region ZO and a zoom-in region ZI that are set when the state of the digital camera 100 detected by the shaking detection unit 125 indicates a fixed state. When the digital camera 100 is fixed with a tripod or the like, an object is unlikely to move to outside the frame due to camera shake. Furthermore, if a zoom-in operation is performed when the object is not set in the frame in the vicinity of the central portion of the image plane, the object may move to outside the frame due to the zoom-in operation.

Accordingly, the automatic zoom control unit 122 sets the zoom-out region ZO at the entire peripheral portion of the image plane, and sets the zoom-in region ZI inside the zoom-in angle of field. Then, when the face tracking frame 400e enters the zoom-out region ZO, the automatic zoom control unit 122 determines to start zoom-out and performs a zoom-out operation by a predetermined zoom magnification. Furthermore, when the face tracking frame 400f becomes set inside the zoom-in region ZI, the automatic zoom control unit 122 determines to start zoom-in and performs a zoom-in operation by a predetermined zoom magnification up to a zoom return position 403.

In this way, dynamically changing the settings of the zoom-out region ZO and the zoom-in region ZI according to changes of the orientation of the digital camera 100 and the shooting state (hand-held state or fixed state) enables effectively preventing an object from moving to outside the frame while preventing any malfunction caused by camera shake or the like. Furthermore, the automatic zoom control unit 122 may be configured to change the setting of the zoom-out region ZO or the zoom-in region ZI according to any one of the orientation of the digital camera 100 and the shooting state (hand-held state or fixed state). Moreover, the automatic zoom control unit 122 may be configured to change the setting of only one of the zoom-out region ZO and the zoom-in region ZI.

Next, a zoom operation for keeping the proportion of the region of an object to the image plane almost constant is described. Here, in a case where the detected size of an object has changed to a size larger than a predetermined number of times the reference size, the automatic zoom control unit 122 automatically performs a zoom operation in a direction to reduce the change, thus keeping the size of the object within a predetermined range from the reference size.

Figure 6A:
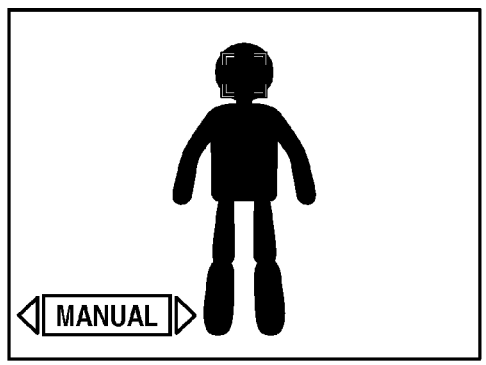
FIGS. 6A, 6B, 6C, and 6D illustrate the setting of a composition pattern in a case where the object is a person.

First, the setting of a size (a composition pattern) serving as a reference for an object to be tracked on the image plane is described with reference to FIGS. 6A, 6B, 6C, and 6D. FIGS. 6A, 6B, 6C, and 6D illustrate the setting of a composition pattern (composition setting) in a case where the object is a person. FIG. 6A indicates a screen display in a case where the composition pattern is set to "manual". At the time of the "manual" setting, the operator performs manual zoom by operating a zoom lever while viewing a person displayed in the image plane, thus changing the size of the face to be tracked, and stores the changed object size (the size of the face), as a reference size, into the memory 118.

Figure 6B:
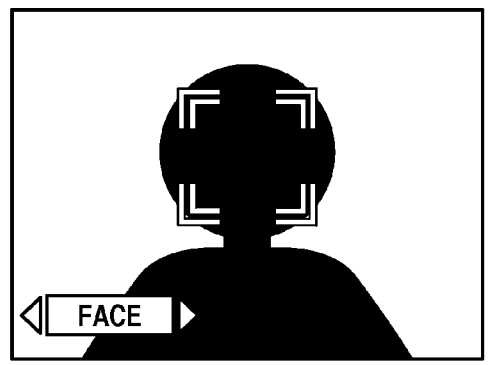
Figure 6C:
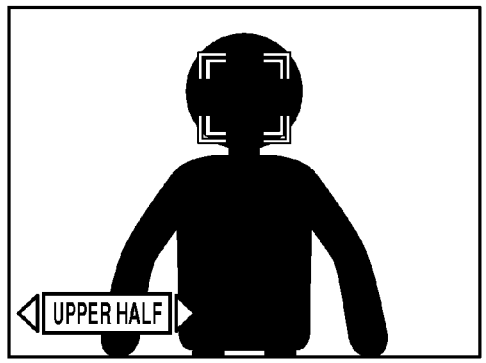
Figure 6D:
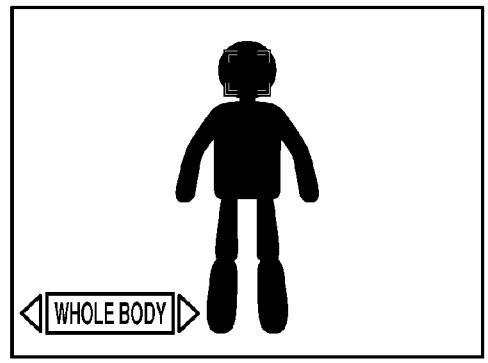

FIG. 6B indicates a screen display in a case where the composition pattern is set to "face". At the time of the "face" setting, the automatic zoom control unit 122 calculates, as a reference size, the size allowing the face to be set in the image plane according to the orientation of the digital camera 100 and the direction of the face, and stores the reference size into the memory 118. Similarly, FIG. 6C and FIG. 6D indicate screen displays in cases where the composition pattern is set to "upper half" and "whole body", respectively. At the time of each of the "upper half" setting and the "whole body" setting, the automatic zoom control unit 122 calculates the reference size in such a way as to allow the upper half or the whole body to reach a set size on the image plane, and stores the reference size into the memory 118. The method for calculating the reference size is described below with reference to FIG. 9.

The operator can change the composition setting from a captured image via a left/right button operation or a setting menu on the operation unit 117. When an operation for changing the composition setting is performed by the operator, the automatic zoom control unit 122 updates information about the composition setting stored in the memory 118. While FIGS. 6A to 6D illustrate examples in which, when the object is a person, the composition pattern is set to "manual", "face", "upper half", and "whole body", respectively, the composition setting is not limited to these examples. The composition setting may include the setting of only a part of the four example composition patterns or may include another composition pattern. Furthermore, in a case where the object is a thing, the composition pattern may be set to, for example, "manual", "large", "medium", and "small".

Furthermore, in the present exemplary embodiment, a case is described in which the composition pattern is set by the operation of the operator. However, the composition pattern may be automatically determined by the digital camera 100 according to a shooting scene. Moreover, the digital camera 100 may be configured to allow the operator to select, via a setting menu or the like, between a mode in which the composition pattern is set by the operation of the operator and a mode in which the composition pattern is automatically set by the digital camera 100.

A zoom operation for keeping the proportion of an object to the image plane within a predetermined range is described taking as an example a case where the composition setting is "manual". FIGS. 5A, 5B, and 5C illustrate an example in which, when a person serving as an object has approached the digital camera 100, the digital camera 100 automatically performs a zoom operation in such a way as to set the proportion of the object to the image plane within a predetermined ratio. In FIGS. 5A to 5F, the face tracking frames 500a to 500f are displayed in such a way as to surround the face region as a feature region of a person being an object. Accordingly, the following description is made assuming that the size of the face tracking frame is equal to the object size.

FIG. 5A indicates the angle of field obtained when an object is specified according to an object specifying method that is described below. The size of the face tracking frame 500a at the time of specifying the object is stored, as a reference object size (reference size), into the memory 118.

FIG. 5B indicates the angle of field obtained when the object has approached the digital camera 100 in a state in which the zoom magnification is not changed from the state illustrated in FIG. 5A. For example, suppose that the size equivalent to 150% of the size of the face tracking frame 500a serving as the reference object size is set as a start size for the zoom-out operation. When the object tracking frame (face tracking frame) has reached a relation of "face tracking frame 500b>face tracking frame 500a×150%" (the face tracking frame has changed more than a predetermined amount of change relative to the reference size), the automatic zoom control unit 122 determines to start a zoom-out operation.

FIG. 5C indicates the angle of field obtained by zooming out a predetermined zoom magnification from the angle of field 501 illustrated in FIG. 5B and the face tracking frame 500c. Here, in consideration of a rate of change (150%) of the face tracking frame size from the reference object size at the time of starting a zoom-out operation, the predetermined zoom magnification is set to 1/1.5 times. After this, when the object further approaches, the automatic zoom control unit 122 further performs a zoom-out operation toward the wide-angle side, thus continuing setting the object within a predetermined ratio. Therefore, the operator is able to concentrate on only a release switch operation.

On the other hand, FIGS. 5D, 5E, and 5F illustrate an example in which, when a person serving as an object moves away from the digital camera 100, the digital camera 100 automatically performs a zoom operation in such a way as to set the proportion of the object to the image plane within a predetermined range.

FIG. 5D illustrates the angle of field obtained when an object is specified according to the object specifying method, which is described below. The size of the face tracking frame 500d at the time of specifying the object is stored, as a reference object size, into the memory 118 (in a case where the composition setting is "manual").

FIG. 5E indicates the angle of field obtained when the object has moved away from the digital camera 100 in a state in which the zoom magnification is not changed from the state illustrated in FIG. 5D. For example, suppose that the size equivalent to 50% of the size of the face tracking frame 500d serving as the reference object size is set as a start size for the zoom-in operation. When the object tracking frame (face tracking frame) has reached a relation of "face tracking frame 500e<face tracking frame 500d×50%" (the face tracking frame has changed more than a predetermined amount of change relative to the reference size), and the face tracking frame 500e has been set in the zoom-in region ZI, the automatic zoom control unit 122 determines to start a zoom-in operation. Here, the zoom-in region ZI is set inside the angle of field 502 obtained by zooming in by a predetermined zoom magnification relative to the angle of field illustrated in FIG. 5E.

FIG. 5F indicates the angle of field obtained by zooming in by a predetermined zoom magnification from the angle of field illustrated in FIG. 5E and the face tracking frame 500f. Here, in consideration of a rate of change (50%) of the face tracking frame size from the reference object size at the time of starting a zoom-in operation, the predetermined zoom magnification is set to 1/0.5 times.

With regard to FIGS. 3A and 3B and FIGS. 4A, 4B, and 4C, processing for preventing an object from moving to outside the frame in a case where the object is a thing or person has been described. Moreover, with regard to FIGS. 5A to 5F, processing for setting the ratio of the size of an object to the image plane within a predetermined range in a case where the object is a person has been described. In addition, also in a case where an object to be tracked is a thing, the automatic zoom control unit 122 may perform a zoom operation start determination for object size keeping control illustrated in FIGS. 5A to 5F, like in a case where the object is a person. Furthermore, also in a case where the composition setting is other than "manual", the automatic zoom control unit 122 performs an automatic zoom operation similar to that illustrated in FIGS. 5A to 5F according to the associated reference size.

Figure 7:
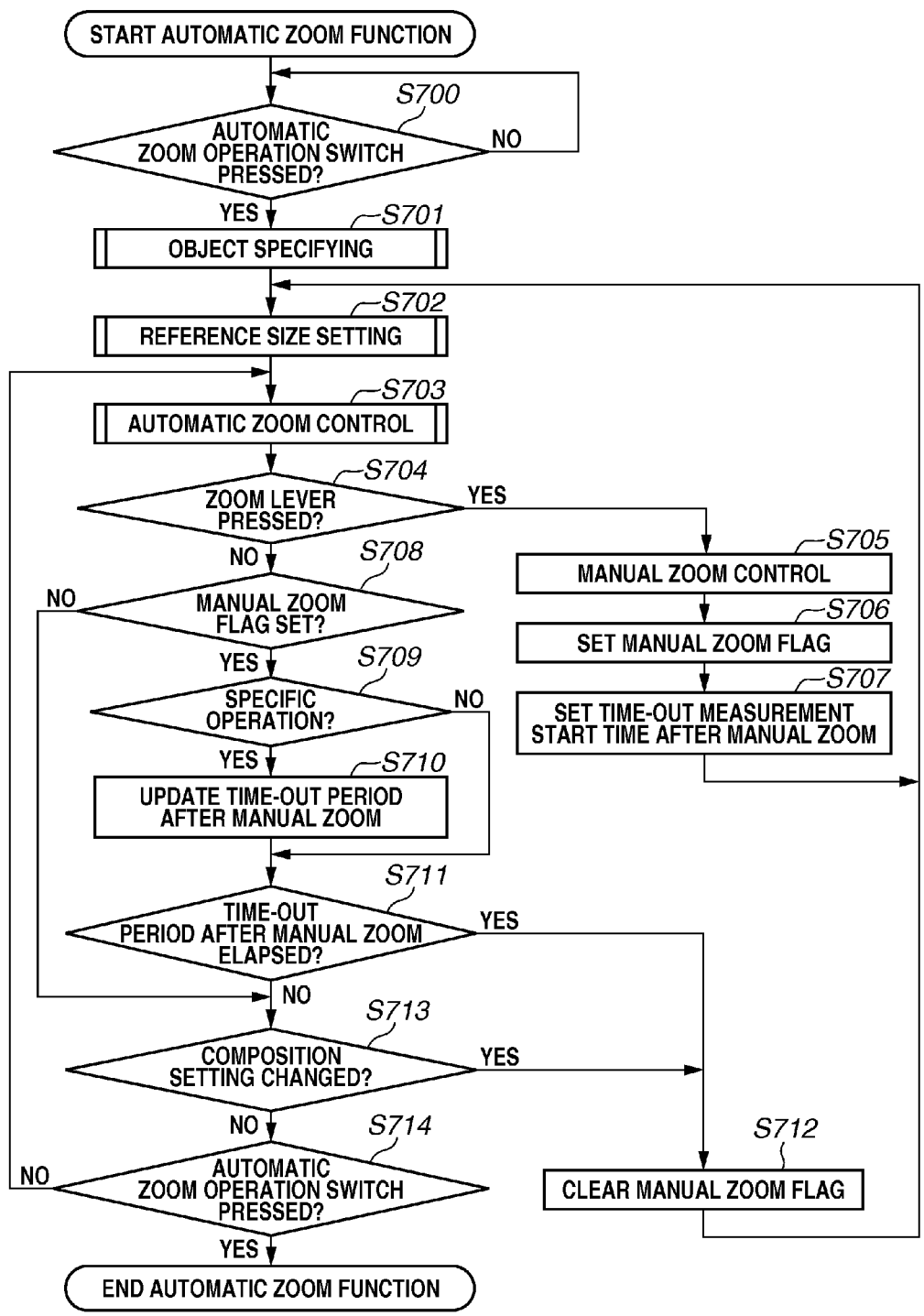
FIG. 7 is a flowchart illustrating the flow of processing for an automatic zoom function.

Next, processing for the automatic zoom function is described with reference to FIGS. 7 to 14. FIG. 7 is a flowchart illustrating processing for the entirety of the automatic zoom function. Unless otherwise described, the automatic zoom function illustrated in FIG. 7 is effected based on instructions of the system control unit 114 (the automatic zoom control unit 122).

First, in step S700, the automatic zoom control unit 122 determines whether an automatic zoom operation switch of the operation unit 117 has been pressed. If it is determined that the automatic zoom operation switch has been pressed (YES in step S700), the processing proceeds to step S701. In step S701, the automatic zoom control unit 122 performs object specifying processing.

Figure 8A:
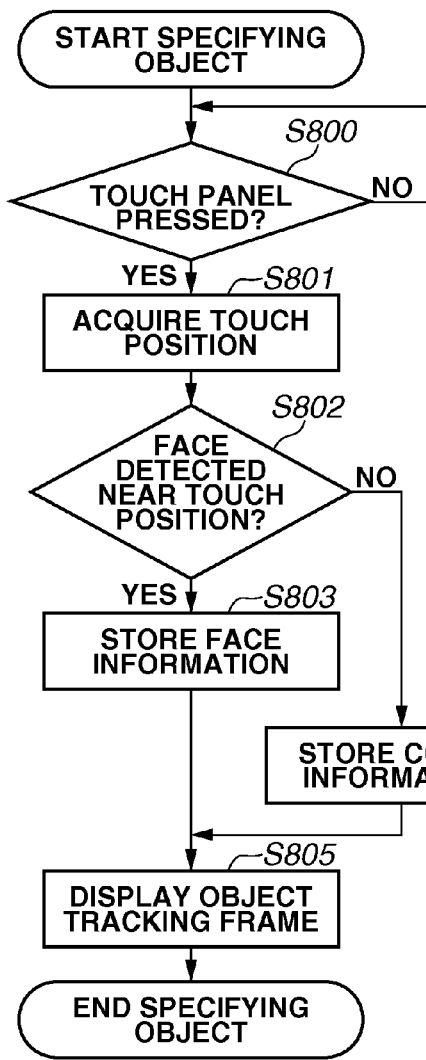

The object specifying processing in step S701 is described with reference to FIGS. 8A, 8B, and 8C. FIG. 8A is a flowchart illustrating an example of an operation for touching and specifying an object displayed on the display unit 109 using a touch panel, which is a member constituting the operation unit 117. In step S800, the automatic zoom control unit 122 determines whether the touch panel has been pressed. If it is determined that the touch panel has been pressed (YES in step S800), the processing proceeds to step S801. In step S801, the automatic zoom control unit 122 acquires information about the touched position (touch position).

Then, in step S802, the automatic zoom control unit 122 notifies the object detection unit 123 of the touch position, and the object detection unit 123 performs face detection near the touch position. If a face has been detected near the touch position (YES in step S802), the object detection unit 123 determines that the main object is a person, and the processing proceeds to step S803. In step S803, the automatic zoom control unit 122 stores, into the memory 118, face information of the person targeted for automatic tracking. Specifically, the face information includes the size of a face detected at the time of object specifying, the detected position of the face, and the direction of the face. Furthermore, in the case of a camera having a face authentication function, the automatic zoom control unit 122 also stores an authentication identifier (ID).

On the other hand, if, in step S802, no face has been detected near the touch position (NO in step S802), the object detection unit 123 determines that the main object is a thing, which is other than persons, and the processing proceeds to step S804. In step S804, the automatic zoom control unit 122 stores, into the memory 118, a feature color detected near the touch position as color information of the automatic tracking target. Specifically, the color information includes the color, luminance, and color-difference values of the feature color at the time of object specifying, the size of the same color region, and the center-of-mass position of the same color region. In the following description, the face information and the color information are collectively referred to as "object information" (object size, object-detected position, etc.).

After the object information has been stored in step S803 or S804, the processing proceeds to step S805. In step S805, the automatic zoom control unit 122 displays, on the display unit 109, an object tracking frame (a thing tracking frame or a face tracking frame) with a size corresponding to the object size centering on the object-detected position. Then, the object specifying processing ends.

In this way, the system control unit 114 (the object detection unit 123) detects an object in the position or in the vicinity of the position specified by the operator on the display unit 109. Then, the system control unit 114 (the automatic zoom control unit 122) displays an object tracking frame on the display unit 109. According to the flowchart of FIG. 8A, an object that the operator intends to track can be easily specified by an intuitive specifying method.

Figure 8B:
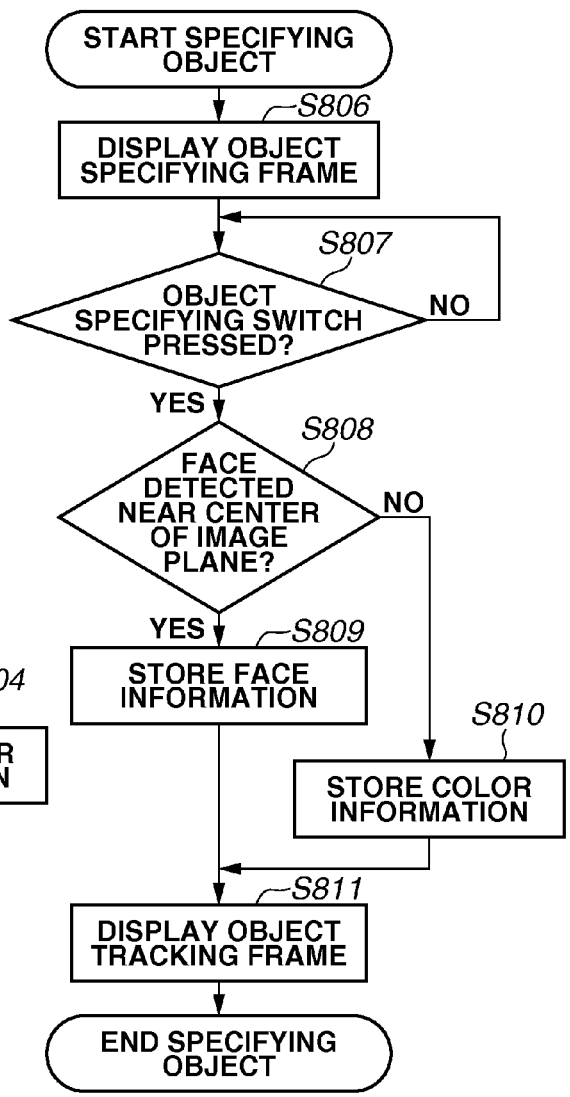

FIG. 8B is a flowchart illustrating an example of an operation for specifying an object using a switch (an object specifying switch) other than the automatic zoom operation switch, which is also a member constituting the operation unit 117. First, in step S806, the automatic zoom control unit 122 displays a frame, serving as a guide for object specifying, in the vicinity of the center of the image plane of the display unit 109. The operator adjusts the orientation of the digital camera 100 in such a way as to set an object, which the operator intends to track, in the vicinity of the center using the frame as a guide.

Then, in step S807, the automatic zoom control unit 122 determines whether the object specifying switch has been pressed. If the object specifying switch has been pressed (YES in step S807), the processing proceeds to step S808.

In step S808, the object detection unit 123 performs face detection near the center of the image plane. If a face has been detected near the center of the image plane (YES in step S808), the object detection unit 123 determines that the main object is a person, and the processing proceeds to step S809. On the other hand, if no face has been detected near the center of the image plane (NO in step S808), the object detection unit 123 determines that the main object is a thing, which is other than persons, and the processing proceeds to step S810.

After the automatic zoom control unit 122 stores the object information in step S809 or S810, the processing proceeds to step S811. In step S811, the automatic zoom control unit 122 displays an object tracking frame (a thing tracking frame or a face tracking frame). Then, the object specifying processing ends. The basic processing details in steps S809, S810, and S811 illustrated in FIG. 8B are respectively similar to those in steps S803, S804, and S805 illustrated in FIG. 8A.

In this way, the system control unit 114 (the object detection unit 123) detects an object in the position of the center of the image plane or in the vicinity of the position of the center of the image plane of the display unit 109. Then, the system control unit 114 (the automatic zoom control unit 122) displays, on the display unit 109, an object tracking frame indicating the position of the object. According to the flowchart of FIG. 8B, an object can be easily specified even with a camera unequipped with an operation member such as a touch panel.

FIG. 8C is a flowchart illustrating an example of an operation for automatically selecting an object to be tracked from among faces detected at a point of time when an automatic zoom operation switch, which is a member constituting the operation unit 117, has been pressed. First, in step S812, the object detection unit 123 performs face detection on the entire image plane. If at least one face has been detected on the entire image plane (YES in step S812), the object detection unit 123 determines that the main object is a person, and the processing proceeds to step S813.

In step S813, if only one face has been detected, the object detection unit 123 sets the detected face as a main face. If a plurality of faces has been detected, the object detection unit 123 selects a main face, serving as an object to be tracked, from among the detected faces. As criteria for selecting a main face, for example, there is a method of selecting a face the detected position of which is closest to the vicinity of the center of the image plane. Furthermore, if a plurality of faces is located at the equivalent positions, there is a method of selecting, as a main face, a face having the largest size. Moreover, in the case of a camera having a face authentication function, if a face that has previously been authenticated and registered has been detected, there is a method of selecting the detected face as a main face.

Then, in step S814, the automatic zoom control unit 122 stores face information of the selected main face into the memory 118. After the face information has been stored in step S814, the processing proceeds to step S815. In step S815, the automatic zoom control unit 122 displays a face tracking frame.

Then, in step S816, if the main face that has been automatically selected from among a plurality of detected faces is a face that the operator does not intend to select, the operator is allowed to change the main face. In this instance, the operator can press a switch (which may be the automatic zoom operation switch or another switch) of the operation unit 117 to change the main face to a face that has not been selected as the main face from among the faces the face tracking frames for which have been detected. If the main face has been changed (YES in step S816), the processing returns to step S814, in which the automatic zoom control unit 122 updates the stored face information. Then, in step S815, the automatic zoom control unit 122 changes the face tracking frame to that with the size and detected position of the new selected main face.

On the other hand, if, in step S812, no face has been detected on the entire image plane (NO in step S812), the object detection unit 123 determines that the main object is a thing, which is other than persons, and the processing proceeds to step S817. In step S817, the automatic zoom control unit 122 stores, into the memory 118, a feature color obtained near the center of the image plane as color information of the automatic tracking target. After the thing information has been stored in step S817, the processing proceeds to step S818. In step S818, the automatic zoom control unit 122 displays a thing tracking frame. Then, the object specifying processing ends. The basic processing details in steps S814, S817, and S815 (S818) illustrated in FIG. 8C are respectively similar to those in steps S803, S804, and S805 illustrated in FIG. 8A.

In this way, the system control unit 114 (the object detection unit 123) performs face detection on the entire image plane of the display unit 109. If a plurality of faces has been detected, the system control unit 114 (the automatic zoom control unit 122) displays, on the display unit 109, an object tracking frame indicating the position of a first face as an object from among the detected plurality of faces. Furthermore, if the first face has been changed to a second face as the object, the system control unit 114 (the automatic zoom control unit 122) displays, on the display unit 109, an object tracking frame indicating the position of the second face. According to the flowchart of FIG. 8C, an object can be easily specified with a less number of times of operation.

After the object specifying processing illustrated in FIG. 8A, 8B, or 8C has ended, the processing proceeds to step S702 illustrated in FIG. 7. In step S702, the automatic zoom control unit 122 sets, as a reference size, the size of the object to be tracked.

Figure 9:
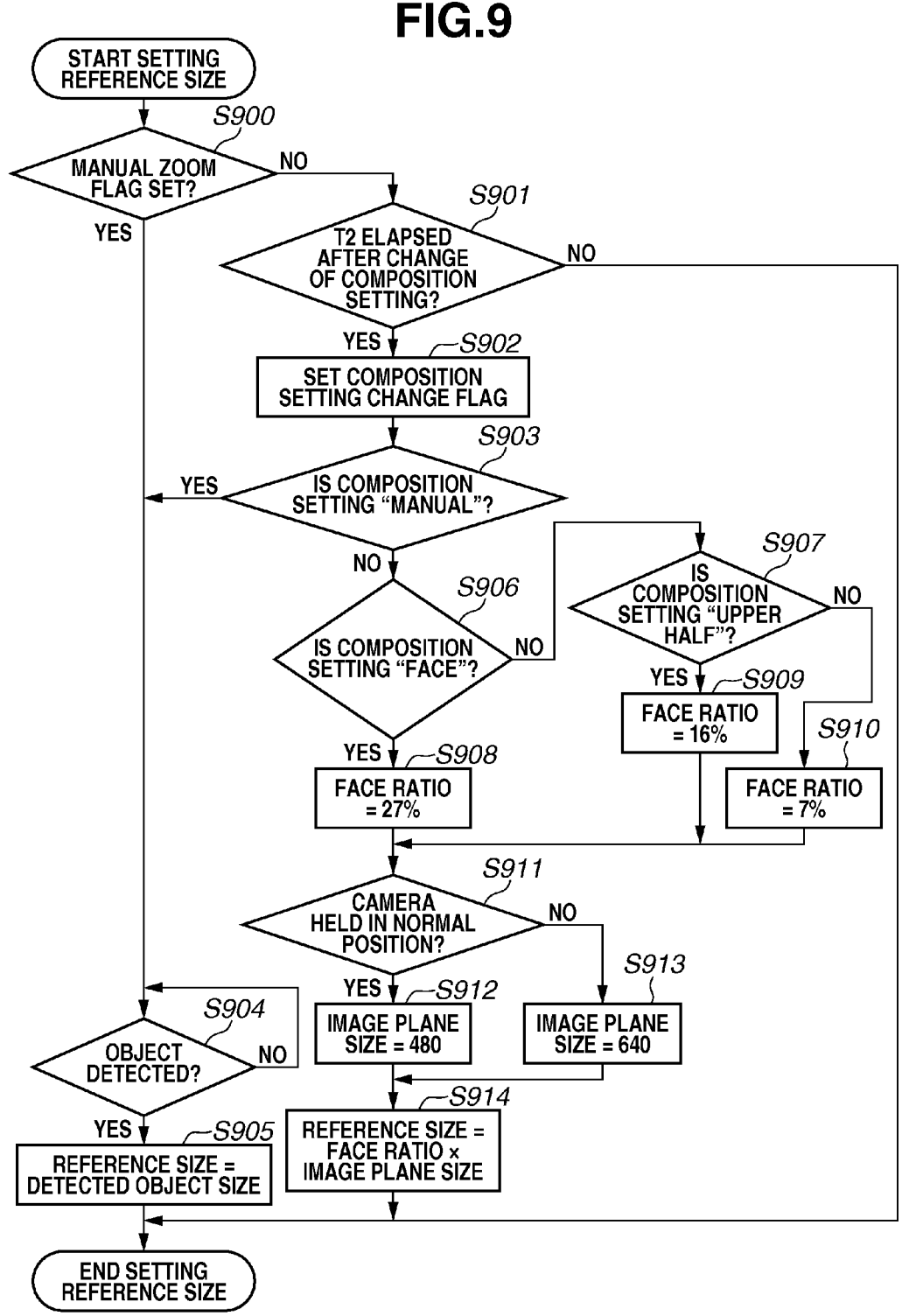
FIG. 9 is a flowchart illustrating processing for setting a reference size.

The reference size setting processing in step S702 is described with reference to FIG. 9. FIG. 9 is a flowchart illustrating an example of an operation for setting the reference size in a case where the object is a person. First, in step S900, the automatic zoom control unit 122 determines whether a manual zoom flag is set (true). The manual zoom flag is a flag indicating whether manual zoom control by a zoom lever operation has just been performed, and is set in step S706 in FIG. 7, which is described below. If the manual zoom flag is false (NO in step S900), the processing proceeds to step S901. If the manual zoom flag is true (YES in step S900), the processing proceeds to step S904.

In step S901, the automatic zoom control unit 122 determines whether a predetermined time T2 has elapsed after a change of the composition setting, which is determined in step S713 in FIG. 7, which is described below. If the predetermined time T2 has not elapsed (NO in step S901), since there is a possibility that the composition setting is changed again, the automatic zoom control unit 122 terminates the reference size setting processing without performing the reference size setting. This enables preventing such a malfunction that automatic zoom control starts unintentionally in the course of changing the composition setting with a left/right button operation of the operation unit 117 from a captured image. Furthermore, during the process of adjusting the angle of field of a still image, the composition is to be changed as soon as possible so as not to miss a photo opportunity. On the other hand, during the process of recording a moving image, since a malfunction may affect a recorded moving image, the zoom magnification is to be changed after the composition setting is surely determined. Accordingly, the predetermined time T2 may vary between during the process of adjusting the angle of field of a still image and during the process of recording a moving image (for example, the predetermined time T2 may be set longer for the process of recording a moving image than for the process of adjusting the angle of field of a still image). If, in step S901, it is determined that the predetermined time T2 has elapsed after the change of the composition setting (YES in step S902), the processing proceeds to step S902.

In step S902, the automatic zoom control unit 122 sets a composition setting change flag, which indicates that the change of the composition setting has just been performed. The composition setting change flag is used to determine the setting of a zoom speed in step S1202 in FIG. 12, which is described below, and to determine the updating of a zoom speed during size keeping control in step S1300 in FIG. 13, which is described below. After the composition setting change flag is set in step S902, the processing proceeds to step S903.

In step S903, the automatic zoom control unit 122 determines whether the composition setting, which is stored in the memory 118, is the above-mentioned "manual". If the composition setting is "manual" (YES in step S903), the processing proceeds to step S904. If the composition setting is other than "manual" (NO in step S903), the processing proceeds to step S906.

If, in step S900, the manual zoom flag is true (YES in step S900) or if, in step S903, the composition setting is "manual" (YES in step S903), then in step S904, the automatic zoom control unit 122 determines whether an object has been detected. More specifically, in step S904, the automatic zoom control unit 122 determines whether the object detection unit 123 has detected a face when the object is a person or has detected the same feature color when the object is a thing. The automatic zoom control unit 122 repeats this determination until the object is detected. If the object has been detected (YES in step S904), the processing proceeds to step S905.

In step S905, the automatic zoom control unit 122 sets the size of the detected object as a reference size and stores the reference size into the memory 118. Then, the reference size setting processing ends. Accordingly, in a case where manual zoom control has just been performed or the composition setting is "manual", the automatic zoom control unit 122 stores, into the memory 118, the size of an object that has been first detected after the start of the reference size setting processing, as a reference size.

On the other hand, if, in step S903, it is determined that the composition setting is other than "manual" (NO in step S903), the processing proceeds to step S906. In step S906 to step S910, the automatic zoom control unit 122 determines the ratio of the size of a face to the image plane (face ratio) according to the composition setting. For example, if the composition setting stored in the memory 118 is "face" (YES in step S906), then in step S908, the automatic zoom control unit 122 sets the face ratio to 27%. If the composition setting stored in the memory 118 is "upper half" (YES in step S907), then in step S909, the automatic zoom control unit 122 sets the face ratio to 16%. If the composition setting stored in the memory 118 is "whole body" (NO in step S907), then in step S910, the automatic zoom control unit 122 sets the face ratio to 7%. After the face ratio is determined in step S906 to step S910, the processing proceeds to step S911.

In step S911 to step S913, the automatic zoom control unit 122 determines an image plane size used to calculate the reference size, according to the orientation of the digital camera 100 determined by the orientation detection unit 124. In the present exemplary embodiment, an example in which the image plane size is Video Graphics Array (VGA) (longer side×shorter side=640×480) is described. However, the image plane size is not restrictive. If the digital camera 100 is held in a normal position (YES in step S911), the automatic zoom control unit 122 calculates, as a reference size, the ratio of the size of a face to the size of the image plane in the shorter side direction. Accordingly, in step S912, the automatic zoom control unit 122 sets "480", which is the shorter side size of the image plane, as the image plane size. If the digital camera 100 is held in a portrait mode (NO in step S911), the automatic zoom control unit 122 calculates, as a reference size, the ratio of the size of a face to the size of the image plane in the longer side direction. Accordingly, in step S913, the automatic zoom control unit 122 sets "640", which is the longer side size of the image plane, as the image plane size.

This is a method for determining, on the premise of a person in a standing position, the image plane size used to calculate the reference size based on the orientation of the digital camera 100. In a case where the direction of the face can be detected by the object detection unit 123, the direction of the image plane size used to calculate the reference size may be determined based on the up or down direction of the face on the image plane. While, in the present exemplary embodiment, an example has been described in which the image plane size is VGA of 4:3, the image plane size may be changed according to the setting of an aspect ratio. This enables keeping constant the proportion of the image of a person to the image plane regardless of aspect ratio. After the image plane size has been determined in steps S911 to S913, the processing proceeds to step S914.

In step S914, the automatic zoom control unit 122 calculates the reference size by multiplying the face ratio, determined in steps S906 to S910, by the image plane size, determined in steps S911 to S913. Then, after storing the calculated reference size into the memory 118, the automatic zoom control unit 122 ends the processing for setting the reference size.

After the reference size setting processing illustrated in FIG. 9 ends, the processing proceeds to step S703 illustrated in FIG. 7. In step S703, the automatic zoom control unit 122 performs automatic zoom control based on the object information detected by the object detection unit 123 and the reference size stored in the memory 118. The automatic zoom control is described below with reference to FIG. 10.

After the completion of the automatic zoom control, the processing proceeds to step S704. In step S704, the automatic zoom control unit 122 determines whether the zoom lever of the operation unit 117 has been operated by the operator. In the present exemplary embodiment, an instruction for manual zoom control is issued by an operation of the zoom lever. As described below, since the reference size is updated according to the size of the object detected with an angle of field changed by the manual zoom control, the operation of the zoom lever can be rephrased as "the operation for issuing an instruction to change the reference size". If, in step S704, it is determined that the zoom lever has been operated (YES in step S704), the processing proceeds to step S705.

In step S705, the automatic zoom control unit 122 starts a zoom-in operation or zoom-out operation according to the direction in which the zoom lever is operated, and then stops zoom when the operation of the zoom lever is released during the process of the zoom operation, thus implementing manual zoom control. When the manual zoom control is completed in step S705, the processing proceeds to step S706.

In step S706, the automatic zoom control unit 122 sets the manual zoom flag, which has been described above in step S900 in FIG. 9, and stores the set manual zoom flag into the memory 118.

Then, in step S707, the automatic zoom control unit 122 stores, into the memory 118, the time at which the manual zoom control has ended. This step is performed to measure a time-out period for returning the reference size set by the manual zoom control in step S905 in FIG. 9 to the reference size determined according to the composition setting.

When, in step S707, the automatic zoom control unit 122 has stored the time-out measurement start time after the end of the manual zoom control, the processing returns to step S702. In this instance, since the determination in step S900 in FIG. 9 is YES, the size of the object that has been detected first in steps S904 and S905 is set as the reference size.

On the other hand, if, in step S704, it is determined that the zoom lever is not operated (NO in step S704), the processing proceeds to step S708. In step S708, the automatic zoom control unit 122 determines whether the manual zoom flag, which is configured to be set in step S706, is set. If the manual zoom flag is true, i.e., if the reference size, which is configured to be set by the manual zoom control, is set (YES in step S708), the processing proceeds to step S709.

In step S709, the automatic zoom control unit 122 determines whether a specific operation member of the operation unit 117 has been operated. Here, the specific operation member includes any one of a release switch, a moving image recording switch, and an object specifying switch. If, in step S709, it is determined that the specific operation member has been operated (YES in step S709), the processing proceeds to step S710.

In step S710, the automatic zoom control unit 122 updates the time-out period that has been stored into the memory 118 in step S707. For example, when a starting operation of AF control or AE control by a half-press of the release switch (a preparatory operation of still image shooting), a moving image shooting operation, or an object specifying operation has been performed, the measurement time is reset so as to extend a time required to adjust the composition setting. The automatic zoom control unit 122, after resetting the measurement time, re-performs the measurement of a time-out period (re-measuring time). Furthermore, when still image shooting has been performed by a full press of the release switch with a composition changed by manual zoom, the automatic zoom control unit 122 clears the time-out period (ends measuring the time-out period) so as to restore the set composition pattern.

If, in step S709, it is determined that the specific operation member is not operated (NO in step S709), or if, in step S710, the processing for updating the time-out period ends, the processing proceeds to step S711. In step S711, the automatic zoom control unit 122 determines whether a predetermined time T1 has elapsed from the time-out measurement start time after manual zoom control, which has been stored into the memory 118 in step S707 or S710. If, in step S711, it is determined that the predetermined time T1 has elapsed, i.e., the time-out period has elapsed (YES in step S711), the processing proceeds to step S712.

In step S712, the automatic zoom control unit 122 clears the manual zoom flag set in step S706. Then, the processing returns to step S702. In this instance, since the determination in step S900 in FIG. 9 becomes NO, if a predetermined time T2 has elapsed after the composition setting is changed in step S713, which is described below, the automatic zoom control unit 122 sets the reference size according to the composition setting.

According to this processing, even if the composition setting is set to other than "manual", the operator is allowed to change the size of an object temporarily serving as a criterion for automatic zoom by operating the zoom lever. Furthermore, after the predetermined time T1 has elapsed from the operation of the zoom lever, or after still image shooting has been performed, the automatic zoom control unit 122 restores the composition pattern that has been set, so that a mismatch state in which the actual composition and the composition that has been set differ from each other can be automatically resolved. This enables making the automatic zoom function and the manual zoom function compatible with each other without impairing the operability of manual zoom during the process of automatic zoom. In addition, the time-out period is not limited to a unique time, but may be changed via a setting menu or may be changed during the process of adjusting the angle of field of a still image or the during the process of recording a moving image.

On the other hand, if, in step S708, it is determined that the manual zoom flag is false (NO in step S708), or if, in step S711, it is determined that the time-out period has not elapsed (NO in step S711), the processing proceeds to step S713. In step S713, the automatic zoom control unit 122 determines whether the composition setting has been changed from a captured image by the operator via a left/right button operation on the operation unit 117. If, in step S713, it is determined that the composition setting has been changed (YES in step S713), the processing proceeds to step S712. In step S712, the automatic zoom control unit 122 clears the manual zoom flag. According to this processing, when the composition setting has been changed after manual zoom control is performed (when the manual zoom flag is true), the automatic zoom control unit 122 discards the reference size set by the manual zoom control and updates the reference size according to the changed composition setting. If, in step S713, it is determined that the composition setting has not been changed (NO in step S713), the processing proceeds to step S714.

In step S714, the automatic zoom control unit 122 determines whether the automatic zoom operation switch of the operation unit 117 has been pressed. If it is determined that the automatic zoom operation switch has not been pressed (NO in step S714), the processing returns to step S703, in which the automatic zoom control unit 122 continues automatic zoom control. If it is determined that the automatic zoom operation switch has been pressed (YES in step S714), the automatic zoom control unit 122 ends the automatic zoom function.

Figure 10:
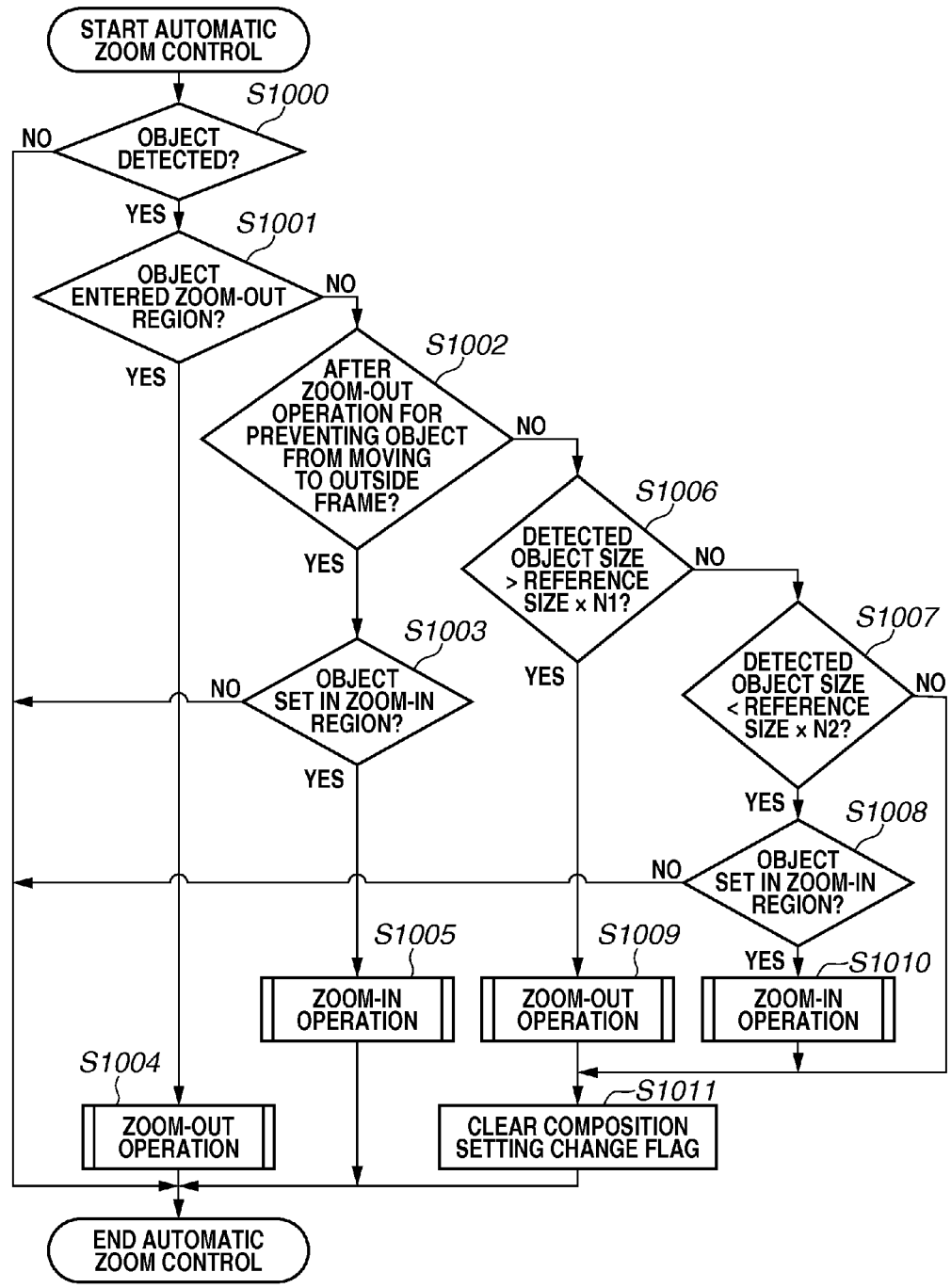
FIG. 10 is a flowchart illustrating processing for automatic zoom control.

Here, the automatic zoom control processing in step S703 is described with reference to FIG. 10. First, in step S1000, the automatic zoom control unit 122 determines whether an object has been detected by the object detection unit 123. If, in step S1000, no object has been detected (NO in step S1000), the automatic zoom control unit 122 ends the automatic zoom control processing. If, in step S1000, an object has been detected (YES in step S1000), the processing proceeds to step S1001.

The determinations in step S1001 to step S1003 correspond to the determination for starting automatic zoom for preventing an object from moving to outside the frame, which has been described with reference to FIGS. 3A and 3B and FIGS. 4A to 4C. In step S1001, the automatic zoom control unit 122 determines whether the object tracking frame of an object to be tracked has entered a zoom-out region ZO. The zoom-out region ZO as used herein corresponds to the zoom-out region ZO described with reference to FIG. 3A and FIGS. 4A to 4C. If, in step S1001, the object tracking frame has entered the zoom-out region ZO, i.e., if there is a great possibility that the object moves to outside the frame (YES in step S1001), the processing proceeds to step S1004. In step S1004, the automatic zoom control unit 122 starts a zoom-out operation. The zoom-out operation as used herein corresponds to a zoom-out operation for preventing an object from moving to outside the frame.

On the other hand, if, in step S1001, the object tracking frame has not entered the zoom-out region ZO, i.e., if the object is captured near the center of the image plane (NO in step S1001), the processing proceeds to step S1002. In step S1002, the automatic zoom control unit 122 determines whether the immediately preceding zoom operation is a zoom-out operation caused by the object tracking frame having entered the zoom-out region ZO, i.e., a zoom-out operation for preventing an object from moving to outside the frame. If the zoom-out operation for preventing an object from moving to outside the frame has just been performed (YES in step S1002), the processing proceeds to step S1003.

In step S1003, the automatic zoom control unit 122 determines whether the object tracking frame for the object to be tracked is set inside (encompassed by) the zoom-in region ZI. The zoom-in region ZI as used herein corresponds to the zoom-in region ZI described with reference to FIG. 3B and FIGS. 4A to 4C. If, in step S1003, the object tracking frame (the object) is not set in the zoom-in region ZI (NO in step S1003), the automatic zoom control processing ends. On the other hand, the object tracking frame is set in the zoom-in region ZI, i.e., if the object image is captured in such a way as to be located near the center of the image plane and to have an object size within the angle of field of the zoom return position (YES in step S1003), the processing proceeds to step S1005. In step S1005, the automatic zoom control unit 122 starts a zoom-in operation. The zoom-in operation as used herein corresponds to a zoom-in operation for preventing an object from moving to outside the frame.

To make the control for preventing an object from moving to outside the frame and the control for keeping the object size in automatic zoom compatible with each other, the control for preventing an object from moving to outside the frame is first performed to capture the object image near the center of the image plane and, then, the control for keeping the object size is enabled to be performed. Therefore, in the condition after a zoom-out operation in the control for preventing an object from moving to outside the frame, automatic zoom processing (steps S1006 to S1010) for keeping the object size constant, which is described below, is prevented from being performed. In other words, in a case where the control for preventing an object from moving to outside the frame has been performed, the control for keeping the object size is restricted until a zoom-in operation in the control for preventing an object from moving to outside the frame is completed.

If, in step S1002, the zoom-out operation for preventing an object from moving to outside the frame has not been performed just before (NO in step S1002), the processing proceeds to step S1006. In step S1006, the automatic zoom control unit 122 compares the size of the object detected in step S1000 with the object size of the reference object information set in step S905 or S914. If the size of the object detected in step S1000 is larger than a predetermined number N1 (N1>1) of times the reference object size, i.e., the ratio of the object to the image plane exceeds a predetermined value (YES in step S1006), the processing proceeds to step S1009. In step S1009, the automatic zoom control unit 122 starts a zoom-out operation. The zoom-out operation as used herein corresponds to a zoom-out operation for preventing an object from moving to outside the frame. After the zoom-out operation is performed, the processing proceeds to step S1011.

On the other hand, if, in step S1006, the size of the object detected in step S1000 is equal to or smaller than N1 times the reference object size (NO in step S1006), the processing proceeds to step S1007. In step S1007, the automatic zoom control unit 122 compares the size of the object detected in step S1000 with the object size of the reference object information. If the size of the object detected in step S1000 is smaller than a predetermined number N2 (N2<1) of times the reference object size, i.e., the ratio of the object to the image plane is less than a predetermined value (YES in step S1007), the processing proceeds to step S1008. On the other hand, if the size of the object detected in step S1000 is equal to or larger than N2 times the reference object size (NO in step S1007), the processing proceeds to step S1011.

In step S1008, the automatic zoom control unit 122 determines whether the object tracking frame of the object to be tracked is set inside (encompassed by) the zoom-in region ZI. This step is performed, when the object is located at the periphery of the image plane, to prevent the object from moving to outside the frame due to the zoom-in operation. The zoom-in region ZI as used herein corresponds to the zoom-in region ZI described with reference to FIG. 5E. If, in step S1008, it is determined that the object tracking frame is not set in the zoom-in region ZI (NO in step S1008), the automatic zoom control processing ends.

On the other hand, if, in step S1008, it is determined that the object tracking frame is set in the zoom-in region ZI (YES in step S1008), the processing proceeds to step S1010. In step S1010, the automatic zoom control unit 122 starts a zoom-in operation. The zoom-in operation as used herein corresponds to the zoom-in operation for size keeping control. In this way, according to the present exemplary embodiment, to prevent an object from moving to outside the frame even in the zoom-in operation for size keeping control, the automatic zoom control unit 122 starts a zoom-in operation after the object is set inside the zoom-in region ZI. After the zoom-in operation is performed, the processing proceeds to step S1011.

When the zoom-out operation or the zoom-in operation for size keeping control has been completed (step S1009 or S1010) or if it is determined that the size of the detected object falls within a predetermined range relative to the reference object size (NO in step S1007), the processing proceeds to step S1011. In step S1011, since the size keeping control associated with the change of the composition setting by the operator has ended, the automatic zoom control unit 122 clears the composition setting change flag set in step S902 illustrated in FIG. 9. Then, the automatic zoom control processing ends.

Figure 11:
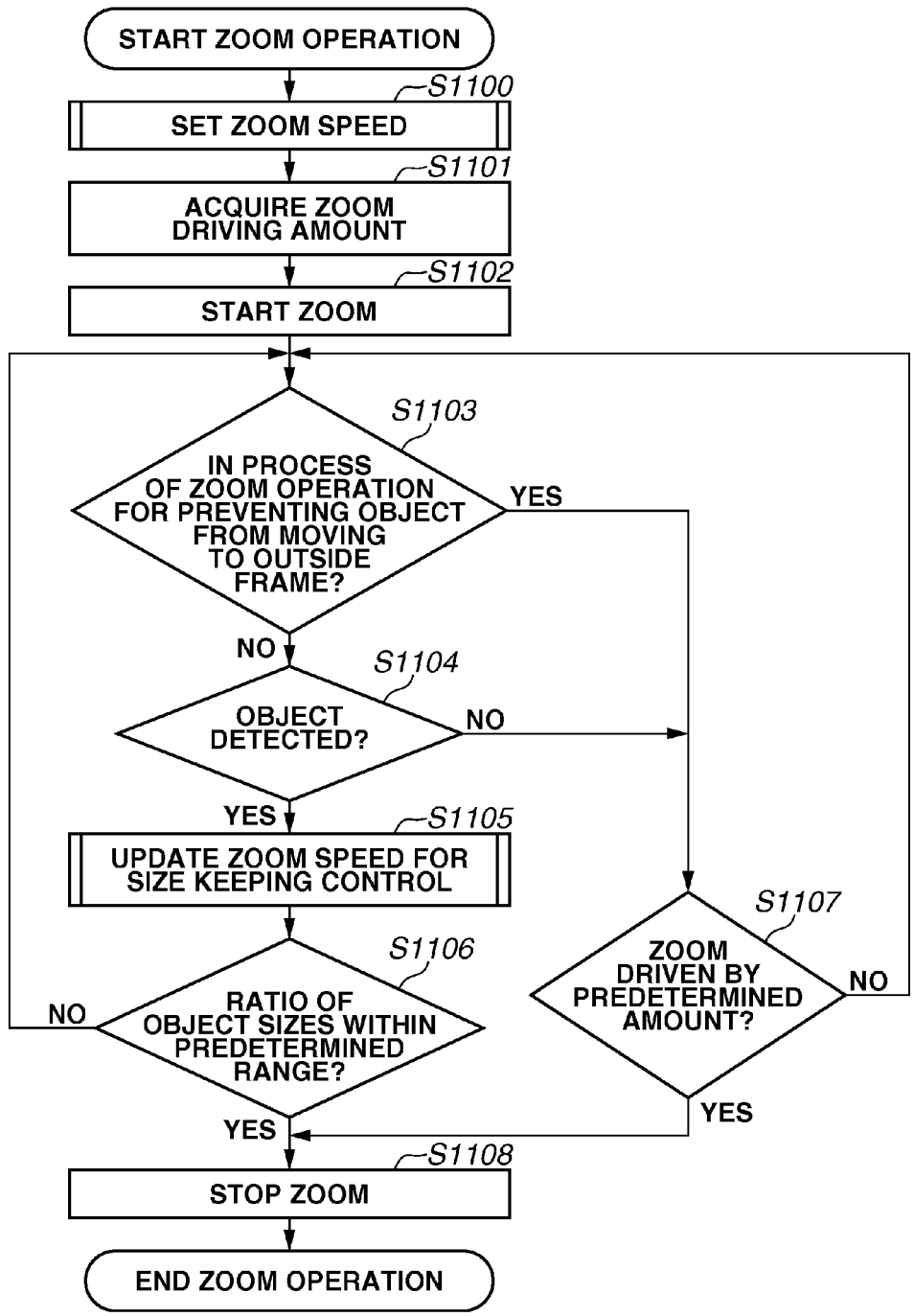
FIG. 11 is a flowchart illustrating a zoom operation.

Here, the zoom operation is described with reference to FIG. 11. FIG. 11 is a flowchart illustrating the zoom-out operation or zoom-in operation performed in step S1004, S1005, S1009, or S1010. First, in step S1100, the automatic zoom control unit 122 sets an optical zoom speed to the CZ control unit 119 in a case where the zoom operation is performed within the optical zoom region or sets an electronic zoom speed to the electronic zoom control unit 120 in a case where the zoom operation is performed within the electronic zoom region. The method for setting the zoom speed is described below with reference to FIG. 12.

Then, in step S1101, the automatic zoom control unit 122 acquires a zoom driving amount (the amount of change of zoom magnification) from the memory 118. In the case of a zoom-out operation for preventing an object from moving to outside the frame, the zoom-out driving amount is set according to the detected object information. More specifically, in the zoom-out operation for preventing an object from moving to outside the frame (step S1004 in FIG. 10), the smaller the size of the object, the smaller the zoom-out driving amount is set. This enables preventing an object from becoming undetectable due to the zoom-out operation causing the size of the object to become too small. Furthermore, in consideration of a minimum size of the detectable object, if the size of the object is smaller than a predetermined size, the automatic zoom control unit 122 may be configured not to perform a zoom-out operation. Moreover, in the zoom-in operation for preventing an object from moving to outside the frame, the automatic zoom control unit 122 stores, in the memory 118, a zoom position taken before the start of the zoom-out operation, and sets the zoom-in driving amount in such a way as to reach the same zoom position as the zoom position taken before the start of the zoom-out operation.

In addition, in the zoom-out operation for size keeping control (step S1009 illustrated in FIG. 10), the automatic zoom control unit 122 sets the zoom-out driving amount (1/N1 times) corresponding to the predetermined N1 times used for the determination in step S1006. This enables performing, even when no object cannot be detected, a minimum of zoom-out operation until the size of an object reaches the reference object size. Also in the zoom-in operation for size keeping control (step S1010 illustrated in FIG. 10), the automatic zoom control unit 122 similarly sets the zoom-in driving amount (1/N2 times) corresponding to the predetermined N2 times used for the determination in step S1007.

In step S1102, the automatic zoom control unit 122 sets the zoom driving amount acquired in step S1101 to the CZ control unit 119 or the electronic zoom control 120, and instructs the CZ control unit 119 or the electronic zoom control 120 to perform zoom processing.

Then, in step S1103, the automatic zoom control unit 122 determines whether the digital camera 100 is in process of the zoom operation for any one of the control for preventing an object from moving to outside the frame and the size keeping control. If the zoom operation in process is the zoom operation for the control for preventing an object from moving to outside the frame (step S1004 or S1005 illustrated in FIG. 10) (YES in step S1103), the processing proceeds to step S1107. If the zoom operation in process is the zoom operation for the size keeping control (step S1009 or S1010 illustrated in FIG. 10) (NO in step S1103), the processing proceeds to step S1104.

In step S1104, the automatic zoom control unit 122 determines whether an object has been detected by the object detection unit 123. If an object has been detected (YES in step S1104), the processing proceeds to step S1105. If no object has been detected (NO in step S1104), the processing proceeds to step S1107.

Figure 13:
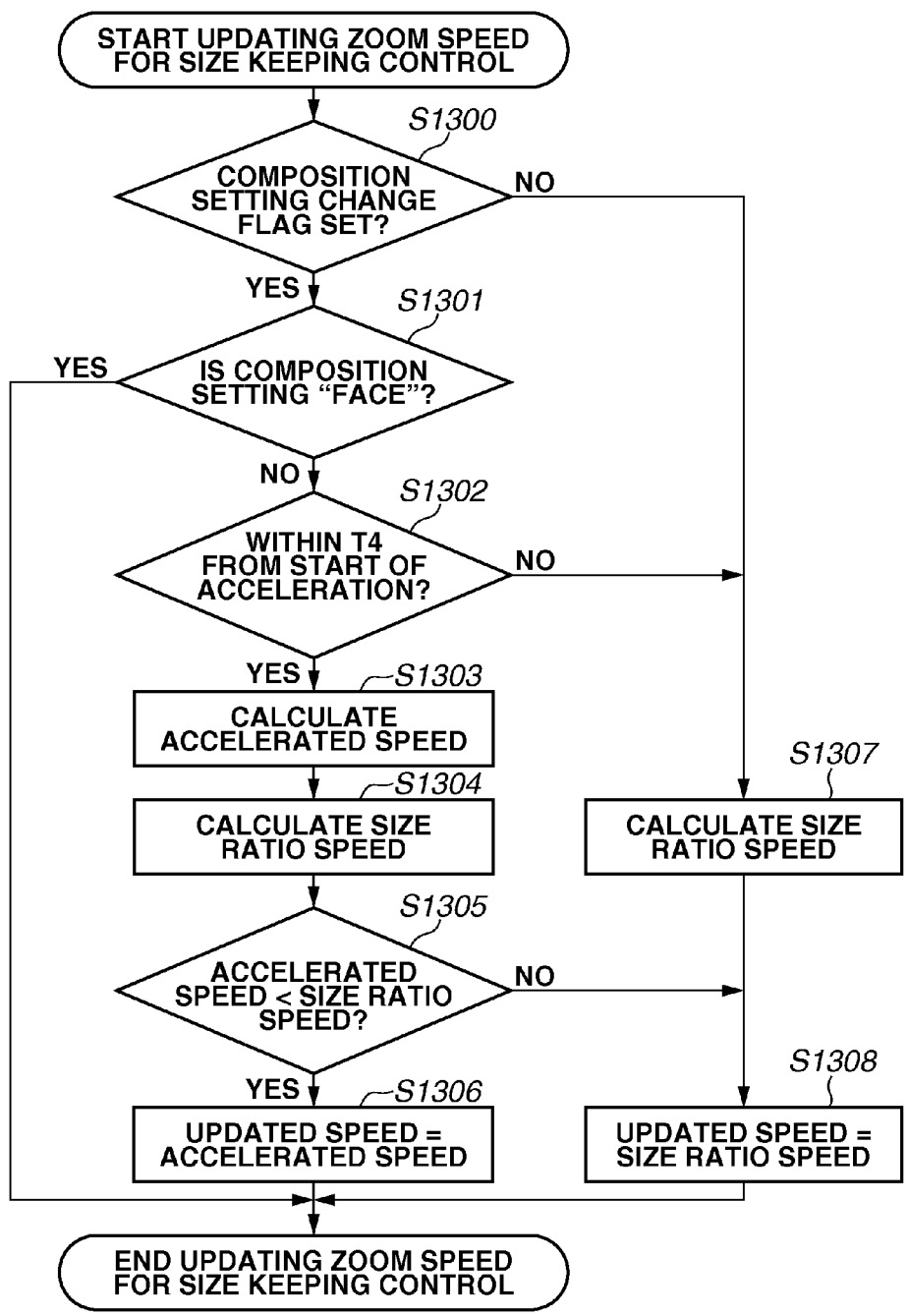
FIG. 13 is a flowchart illustrating processing for updating a zoom speed in size keeping control.

In step S1105, in a case where an object has been detected during the size keeping control, the automatic zoom control unit 122 updates a zoom speed according to a method for updating the zoom speed for size keeping control, which is described below with reference to FIG. 13.

In step S1106, the automatic zoom control unit 122 compares the object size of the reference object information with the size of the object detected in step S1104. If, as a result of the comparison, the ratio between the size of the object detected in step S1104 and the reference object size does not fall within a predetermined range (within a predetermined amount of change) (NO in step S1106), the processing returns to step S1103, in which the automatic zoom control unit 122 continues determining whether to stop the zoom operation. If the ratio has fallen within the predetermined range owing to the zoom operation (YES in step S1106), the processing proceeds to step S1108. In step S1108, the automatic zoom control unit 122 stops the zoom operation. Then, the zoom operation processing ends.

If it is determined in step S1103 that the digital camera 100 is in process of the zoom operation for control for preventing an object from moving to outside the frame (YES in step S1103) or if it is determined in step S1104 that no object has been detected in process of the zoom operation for size keeping control (NO in step S1104), the processing proceeds to step S1107. In step S1107, the automatic zoom control unit 122 determines whether zoom driving has been performed by a predetermined zoom driving amount associated with each zoom operation, based on the zoom driving amount acquired in step S1107. If zoom driving has not been performed by the predetermined zoom driving amount (NO in step S1107), the processing returns to step S1103, in which the automatic zoom control unit 122 continues determining whether to stop the zoom operation. If zoom driving has been performed by the predetermined zoom driving amount (YES in step S1107), the processing proceeds to step S1108, in which the automatic zoom control unit 122 stops the zoom operation, which has been in process. Then, the zoom operation processing ends.

Figure 12:
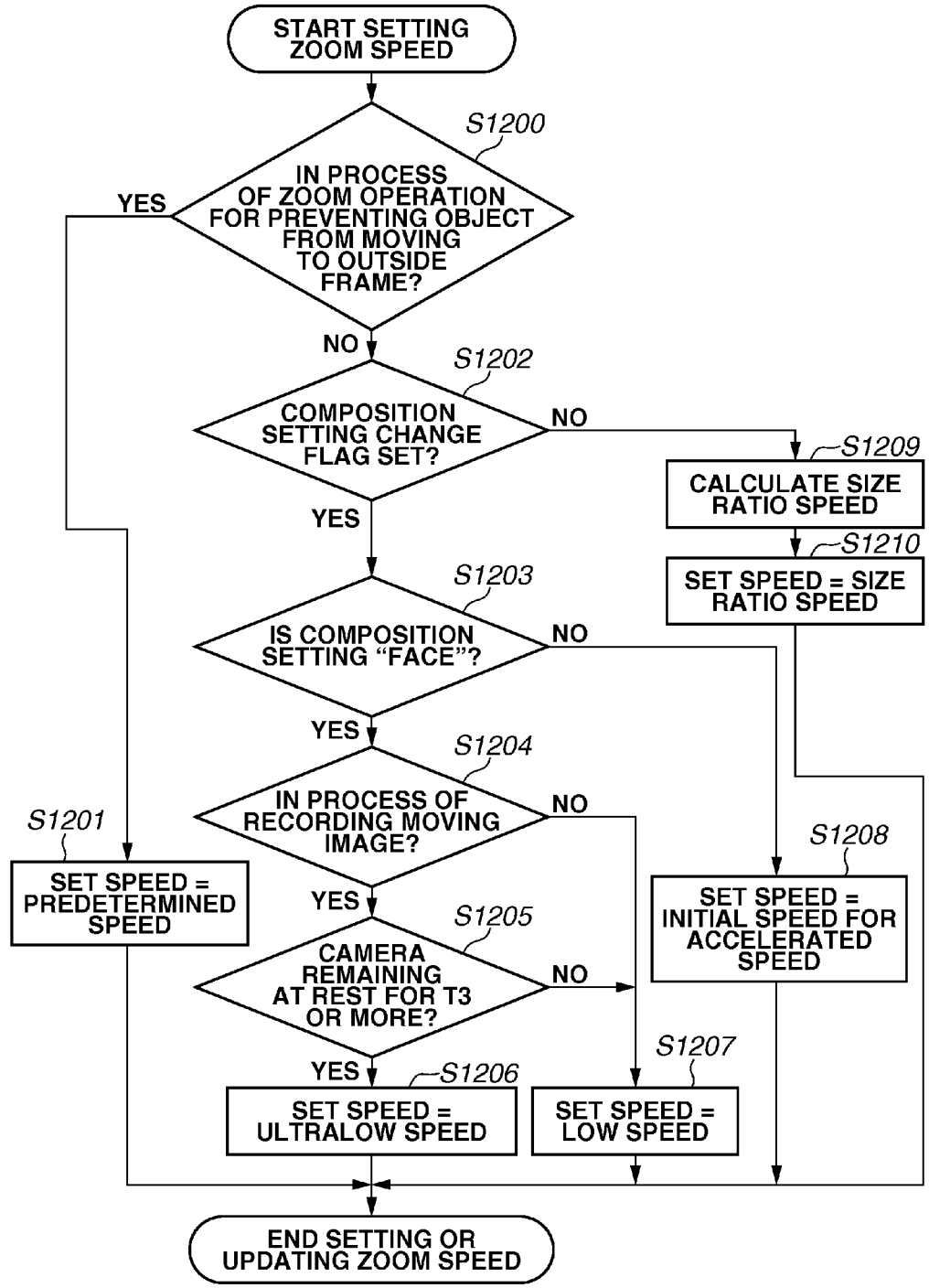
FIG. 12 is a flowchart illustrating processing for setting a zoom speed.

Next, the processing for setting the zoom speed in step S1100 is described with reference to FIG. 12. First, in step S1200, the automatic zoom control unit 122 determines whether the digital camera 100 is in process of the zoom operation for the control for preventing an object from moving to outside the frame. If the zoom operation in process is the zoom operation for the control for preventing an object from moving to outside the frame (YES in step S1200), the processing proceeds to step S1201. If the zoom operation in process is the zoom operation for the size keeping control (NO in step S1200), the processing proceeds to step S1202.

In step S1201, the automatic zoom control unit 122 acquires a predetermined speed for control for preventing an object from moving to outside the frame, which is stored in the memory 118, and sets the predetermined speed to the CZ control unit 119 or the electronic zoom control unit 120. Then, the processing for setting the zoom speed ends.

On the other hand, if, in step S1200, it is determined that the zoom operation in process is the zoom operation for the size keeping control (NO in step S1200), the processing proceeds to step S1202. In step S1202, the automatic zoom control unit 122 determines whether the composition setting change flag, which is to be set in step S902 illustrated in FIG. 9, is set. If the composition setting change flag is true, i.e., if the zoom operation is to be performed due to a change of the composition setting by the operator (YES in step S1202), the processing proceeds to step S1203. If the composition setting change flag is false, i.e., if the zoom operation is to be performed due to the movement of the object (NO in step S1202), the processing proceeds to step S1209.

In step S1203, the automatic zoom control unit 122 determines whether the composition setting stored in the memory 118 is "face" (a first composition). If the composition setting is "face" (YES in step S1203), the processing proceeds to step S1204. If the composition setting is other than "face" (a second composition) (NO in step S1203), the processing proceeds to step S1208.

Steps S1204 to S1207 are performed to determine a zoom speed in a case where the composition setting is set to "face". If the composition setting is set to "face", the automatic zoom control unit 122 sets the zoom speed to a speed lower than the predetermined speed stored in the memory 118. This is performed to prevent an object from moving to outside the frame, by slowly performing a zoom-in operation, since, when the composition setting is "face", if the zoom-in speed is too high, the face may move to outside the frame (image plane).

In step S1204, the automatic zoom control unit 122 determines whether the digital camera 100 is in the process of recording a moving image. If the digital camera 100 is in the process of recording a moving image (YES in step S1204), the processing proceeds to step S1205. If the digital camera 100 is not in the process of recording a moving image (NO in step S1204), the processing proceeds to step S1207.

In step S1205, the automatic zoom control unit 122 determines whether the digital camera 100 remains at rest for a predetermined time or more (a predetermined time T3 or more). If the digital camera 100 remains at rest for the predetermined time T3 or more (YES in step S1205), the processing proceeds to step S1206. Otherwise, the processing proceeds to step S1207.

Step S1206 is performed in a case where, when the composition setting is set to "face", the digital camera 100 remains at rest for the predetermined time T3 or more in the process of recording a moving image. In step S1206, the automatic zoom control unit 122 sets an ultralow zoom speed lower than a low zoom speed set in step S1207, which is described below. According to this step, when capturing a moving image of a person remaining still, for example, a baby's figure during sleep, the operator changes the composition setting from "whole body" to "face", so that the operator can capture such an effective moving image that the baby's figure during sleep is slowly closed up.

If, in step S1204, it is determined that the digital camera 100 is not in the process of recording a moving image (NO in step S1204), or if, in the process of recording a moving image, in step S1205, it is determined that the digital camera 100 does not remain at rest (NO in step S1205), the processing proceeds to step S1207. In step S1207, the automatic zoom control unit 122 sets a zoom speed lower than the predetermined speed that is to be set in step S1201.

In steps S1206 and S1207, the automatic zoom control unit 122 sets the zoom speed, which is used when the composition setting is set to "face", to the CZ control unit 119 or the electronic zoom control unit 120. Then, the processing ends.

On the other hand, if, in step S1203, it is determined that the composition setting is other than "face" (NO in step S1203), then in step S1208, the automatic zoom control unit 122 sets an initial speed for accelerated speed. In a case where the composition setting has been changed to other than "face", the automatic zoom control unit 122 performs acceleration control by, in step S1306 illustrated in FIG. 13, which is described below, updating the speed with an initial speed corresponding to the speed set in step S1208. According to this step, even when the automatic zoom operation is carelessly performed with an unintended composition while the operator is changing the composition setting, the zoom speed is gradually increased, so that the operator can restore the intended composition setting before the composition greatly deviates from the intended composition. Furthermore, even when the composition setting is "face", the speed to be set in step S1207 is set to a speed (low speed) lower than the initial speed for accelerated speed to be set in step S1208, so that a similar effect can be obtained.

On the other hand, if, in step S1202, the composition setting change flag is false (NO in step S1202), i.e., if the zoom operation is performed due to the movement of the object, the processing proceeds to step S1209. In step S1209, the automatic zoom control unit 122 calculates a zoom speed (size ratio speed) based on the ratio (size ratio) of the detected object size (detected size) to the reference object size (reference size).

Figure 14:
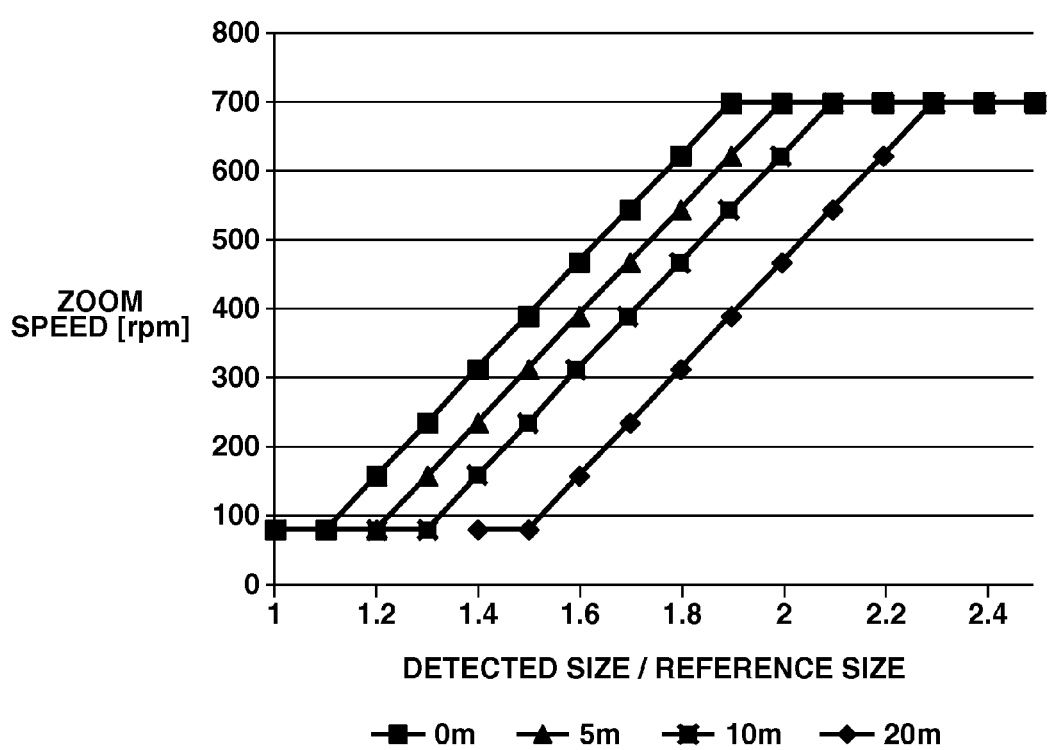
FIG. 14 is a graph illustrating an example of setting of a zoom speed relative to a size ratio.

FIG. 14 is a graph illustrating an example of setting for the zoom speed relative to the size ratio, in which the abscissa axis indicates the size ratio and the ordinate axis indicates the zoom speed. The size ratio is calculated by dividing the detected size by the reference size when the detected size is larger than the reference size, and is calculated by dividing the reference size by the detected side when the detected size is smaller than the reference size. In a case where an object that is moving is tracked via the zoom operation, the zoom speed is set as proportional to the size ratio. In a case where the size ratio becomes greater, i.e., an object is moving at a speed higher than the tracking speed by zooming, the zoom speed is set to a higher speed. On the other hand, when zooming has caught up the object and accordingly as the size ratio approaches "1", the zoom speed is set to a lower speed. Furthermore, in a case where the distance from the digital camera 100 to the object is short, the zoom speed is set to a higher speed, and in a case where the distance is long, the zoom speed is set to a lower speed. This is because as the distance from the digital camera 100 to the object is shorter, the speed of change of the object size on the image plane is higher even when the object moves at the same time.

Here, a method for calculating the distance from the digital camera 100 to an object (object distance) is described. Reference object distances corresponding to reference focal lengths and reference object sizes are previously measured and stored in the memory 118. The object distance can be calculated by performing, on the reference values stored in the memory 118, such an operation as "object distance=(reference object distance×focal length×reference object size)/(reference focal length×detected size)". For example, in a case where the reference values indicate that the reference object distance is 2 m, the reference focal length is 24 mm, and the reference object size is 20 pix, suppose that an object with a detected size of 40 pix has been detected at a focal length of 120 mm. The object distance at this time can be estimated as "(2 m×120 mm×20 pix)/(24 mm×40 pix)=5 m. In this way, the detected size and the object distance can be fed back to the zoom speed, so that a zoom tracking operation associated with the movement of the object can be implemented. The method for calculating the object distance is not restrictive, and a distance metering unit, such as that for calculating the object distance from a result of metering of the phase-difference detection method, may be separated provided.

After the automatic zoom control unit 122 calculates the zoom speed according to the size ratio in step S1209, the processing proceeds to step S1210. In step S1210, the automatic zoom control unit 122 sets the zoom speed (size ratio speed) calculated in step S1209 to the CZ control unit 119 or the electronic zoom control unit 120. Then, the processing ends.

Next, the processing for updating the zoom speed for size keeping control performed in step S1105 illustrated in FIG. 11 is described with reference to FIG. 13. First, in step S1300, the automatic zoom control unit 122 determines whether the composition setting change flag, which is to be set in step S902 illustrated in FIG. 9, is set. If the composition setting change flag is true (YES in step S1300), i.e., if the zoom operation is to be performed due to the composition setting being changed by the operator, the processing proceeds to step S1301. If the composition setting change flag is false (NO in step S1300), i.e., if the zoom operation is to be performed only due to the movement of the object, the processing proceeds to step S1307.

In step S1301, the automatic zoom control unit 122 determines whether the composition setting stored in the memory 118 is "face". If the composition setting is "face" (YES in step S1301), since the automatic zoom control unit 122 does not update (accelerate) the zoom speed set in step S1206 or S1207 illustrated in FIG. 12, the processing for updating the zoom speed ends. If the composition setting is other than "face" (NO in step S1301), the processing proceeds to step S1302.

In step S1302, in acceleration control in a case where the composition setting is other than "face", the automatic zoom control unit 122 determines whether the current time is within a predetermined time T4 from the start of acceleration (the start of the zoom operation). If the current time is within the predetermined time T4 from the start of acceleration (YES in step S1302), since the automatic zoom control unit 122 determines that the zoom operation is in process of acceleration, the processing proceeds to step S1303. As mentioned in the foregoing, when the operator is performing a composition setting, an automatic zoom operation may be started with an unintended composition. Therefore, according to the present exemplary embodiment, the automatic zoom control unit 122 gradually accelerates the zoom speed from a low speed within the predetermined time T4 after the composition has been changed, so that the operator can easily re-set the composition setting before the composition greatly changes. When the predetermined time T4 has elapsed from the start of acceleration (NO in step S1302), since the automatic zoom control unit 122 determines that the acceleration period has ended, the processing proceeds to step S1307.

In step S1303, the automatic zoom control unit 122 calculates an accelerated speed by obtaining an added speed based on a predetermined acceleration stored in the memory 118 and an updating cycle of the zoom speed in the acceleration control. Then, in step S1304, the automatic zoom control unit 122 calculates a zoom speed set according to the size ratio, similar to step S1209 illustrated in FIG. 12. The result of calculation of the zoom speed set according to the size ratio is updated every time the updating processing for the zoom speed is performed, since the detected size or the focal length is changed due to the movement of an object or the zoom operation. After the automatic zoom control unit 122 calculates a zoom speed set according to the size ratio in step S1304, the processing proceeds to step S1305.

In step S1305, the automatic zoom control unit 122 compares the accelerated speed calculated in step S1303 with the zoom speed set according to the size ratio calculated in step S1304. If the accelerated speed is lower than the zoom speed set according to the size ratio (YES in step S1305), the processing proceeds to step S1306. If the accelerated speed is equal to or higher than the zoom speed set according to the size ratio (NO in step S1305), i.e., if it is determined that the zoom speed has reached the size ratio speed due to the acceleration control, the processing proceeds to step S1308.

In step S1306, the automatic zoom control unit 122 sets the accelerated speed calculated in step S1303, as an updated zoom speed, to the CZ control unit 119 or the electronic zoom control unit 120. Then, the processing for updating the zoom speed ends.

On the other hand, if, in step S1300, the composition setting change flag is false (NO in step S1300), or if, in step S1302, it is determined that the acceleration period has ended (NO in step S1302), the processing proceeds to step S1307. In step S1307, the automatic zoom control unit 122 calculates a zoom speed set according to the size ratio, similar to step S1209 illustrated in FIG. 12 or step S1304. When the zoom speed set according to the size ratio has been calculated in step S1307, or if, in step S1305, it is determined that the zoom speed has reached the zoom speed set according to the size ratio due to the acceleration control (NO in step S1305), the processing proceeds to step S1308.

In step S1308, the automatic zoom control unit 122 sets the zoom speed set according to the size ratio calculated in step S1304 or S1307, as an updated zoom speed, to the CZ control unit 119 or the electronic zoom control unit 120. After the updated speed is set in step S1308, the processing for updating the zoom speed ends.

Furthermore, while, in the present exemplary embodiment, the method for setting the zoom speed according to the ratio of the detected size to the reference size has been described, the zoom speed may be set according to the difference of the detected size from the reference size. In this case, as the absolute value of the size difference between the reference size and the detected size is larger, the zoom speed is set to a higher speed.

As described above, according to the present exemplary embodiment, when an automatic zoom operation is performed based on the object size (reference size) set according to the composition setting, the zoom speed is set according to the composition setting. In particular, in a case where a first composition pattern in which the ratio of the object size to the image plane is large is set, the zoom speed is set lower as compared with a case where a second composition pattern in which the ratio of the object size to the image plane is small is set. Furthermore, the method for setting the zoom speed is varied, as described in the above exemplary embodiment, between a case where the first composition pattern is selected and a case where the second composition pattern is selected. This enables implementing, based on a composition setting of an object that the operator intends to capture, an automatic zoom operation at an appropriate zoom speed according to the condition setting of the object.

Furthermore, while, in the present exemplary embodiment, a case where the selected composition pattern is the "face" of a person has been described, this is not restrictive. The present invention can be applied to a case where a composition pattern in which the ratio of the reference size to the image plane is different from that of another composition pattern is settable, as long as the zoom speed is changeable according to the above-mentioned ratio.

Moreover, as a configuration different from that of the above-described exemplary embodiment, when an operation for changing the reference size has been performed, the composition setting may be switched to "manual". In this case, a control operation in which a result of operation for changing the reference size by the operator is prioritized is performed.

In addition, while, in the present exemplary embodiment, an example in which the operation member for changing the reference size is a zoom lever has been described, this is not restrictive. For example, the reference size can be changed by detecting a pinch-in operation or pinch-out operation performed on the display unit 109 via a touch panel. Furthermore, in a case where an operation member, such as a zoom lever, is operated during the automatic zoom operation, only the reference size may be changed without changing the angle of view.

While, in the foregoing, an exemplary embodiment of the present invention has been described, the present invention is not limited to an apparatus primarily intended to perform shooting, such as a camera, but can also be applied to any apparatuses with an imaging apparatus built therein or externally connected thereto, such as a mobile phone, a personal computer (laptop type, desktop type, tablet type, etc.), and a game machine. Accordingly, the term "imaging apparatus" used in the present specification is intended to encompass any electronic apparatuses equipped with an imaging function.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146015 filed Jul. 16, 2014, which is hereby incorporated by reference herein in its entirety.

What is claimed is:

1. An apparatus comprising:
at least one processor or one circuitry which functions as:
an acquisition unit configured to acquire information about a size of an object detected from an image;
a setting unit configured to set a reference size of an object for zoom control; and
a control unit configured to perform the zoom control based on the size of the object indicated by the acquired information and the set reference size,
wherein, in the zoom control, the control unit performs a first control in a case where the reference size is set to a first reference size, and performs a second control in a case where the reference size is set to a second reference size larger than the first reference size,
wherein the first control and the second control are different in zoom speed, and
wherein, in the first control, a zoom speed is updated in such a way as to increase.

2. An apparatus comprising:
at least one processor or one circuitry which functions as:
an acquisition unit configured to acquire information about a size of an object detected from an image;
a setting unit configured to set a reference size of an object for zoom control; and
a control unit configured to perform the zoom control based on the size of the object indicated by the acquired information and the set reference size,
wherein, in the zoom control, the control unit switches between first control and second control according to the set reference size,
wherein the setting unit sets the reference size according to a composition pattern selected from among a plurality of composition patterns, and
wherein, in the zoom control, the control unit changes a zoom speed based on the composition pattern selected from among a plurality of composition patterns and the size of the object.

3. The apparatus according to claim 1, wherein an initial speed of the zoom speed set in the first control is higher than the zoom speed set in the second control.

4. The apparatus according to claim 1, wherein, in the second control, the control unit changes a zoom speed according to whether a predetermined shooting condition is satisfied.

5. The apparatus according to claim 4, wherein, in the second control, the predetermined shooting condition is satisfied in a case where a moving image is being recorded and a first predetermined time has elapsed after the zoom control apparatus stops, and
wherein a zoom speed to be set when the predetermined shooting condition is satisfied is lower than a zoom speed to be set when the predetermined shooting condition is not satisfied.

6. The apparatus according to claim 1, wherein, in the first control, when the updated zoom speed has reached a predetermined speed, the control unit performs the zoom control at the predetermined speed.

7. The apparatus according to claim 1, wherein, when a second predetermined time has elapsed after the control unit starts the first control, the control unit performs the zoom control at a predetermined speed.

8. The apparatus according to claim 6, wherein, as a difference between the size of the object indicated by the acquired information and the reference size is greater, the predetermined speed is set higher.

9. The apparatus according to claim 6, wherein the predetermined speed is set according to a ratio between the size of the object indicated by the acquired information and the reference size.

10. The apparatus according to claim 6,
wherein, as a distance from the apparatus to the object is longer, the predetermined speed is set higher.

11. The apparatus according to claim 2, wherein, in the zoom control, the control unit performs the first control in a case where the reference size is set to a first reference size, and performs the second control in a case where the reference size is set to a second reference size larger than the first reference size.

12. The apparatus according to claim 1, wherein, if the reference size is changed during the zoom control, the control unit sets a zoom speed based on the changed reference size.

13. The apparatus according to claim 1, wherein, in the zoom control, the control unit changes a zoom magnification in such a way that the size of the object indicated by the acquired information falls within a predetermined range relative to the reference size.

14. The apparatus according to claim 13, wherein changing of the zoom magnification is performed according to at least one of optical zoom and electronic zoom.

15. A method comprising:
acquiring information about a size of an object detected from an image;
setting a reference size of an object for zoom control; and
performing the zoom control based on the size of the object indicated by the acquired information and the set reference size,
wherein the zoom control performs a first control in a case where the reference size is set to a first reference size, and performs a second control in a case where the reference size is set to a second reference size larger than the first reference size,
wherein the first control and the second control are different in zoom speed, and
wherein, in the first control, a zoom speed is updated in such a way as to increase.

16. The method according to claim 15, further comprising setting an initial speed of the zoom speed in the first control higher than an initial speed of the zoom speed in the second control.

17. The method according to claim 15, further comprising setting a zoom speed based on the changed reference size if the reference size is changed during the zoom control.

18. A non-transitory computer-readable storage medium storing a control program that causes a computer to execute a method comprising:
- acquiring information about a size of an object detected from an image;
- setting a reference size of an object for zoom control; and
- performing the zoom control based on the size of the object indicated by the acquired information and the set reference size,
- wherein the zoom control performs a first control in a case where the reference size is set to a first reference size, and performs a second control in a case where the reference size is set to a second reference size larger than the first reference size,
- wherein the first control and the second control are different in zoom speed, and
- wherein, in the first control, a zoom speed is updated in such a way as to increase.

19. The non-transitory computer-readable storage medium according to claim 18, wherein the method further comprises setting an initial speed of the zoom speed in the first control higher than an initial speed of the zoom speed in the second control.

20. The non-transitory computer-readable storage medium according to claim 18, wherein the method further comprises setting a zoom speed based on the changed reference size if the reference size is changed during the zoom control.

21. The apparatus according to claim 1, wherein a zoom speed in the second control is lower than an initial seed of a zoom speed in the first control.

22. The apparatus according to claim 1, wherein in the second control, a zoom speed to be set is not updated.

23. The apparatus according to claim 2, wherein, in the first control, a zoom speed is updated in such a way as to increase.

24. The apparatus according to claim 23, wherein in the second control, a zoom speed to be set is not updated.

25. The apparatus according to claim 2, wherein in the zoom control, the control unit changes the zoom speed to be set based on a difference between the reference size and the size of the object.

26. The apparatus according to claim 2, wherein in the zoom control, the control unit changes the zoom speed to be set based on a ratio of the reference size to the size of the object.

27. The apparatus according to claim 1, further comprising a display unit configured to perform a live view display, wherein the display unit displays a selected composition pattern in such a manner that that the selected composition pattern is superimposed on an image to be subjected to the live view display.

28. The apparatus according to claim 1, further comprising a display unit
configured to display the selected composition pattern,
- wherein the control unit changes a zoom speed in response to a change of a composition pattern being displayed on the display unit.

29. The apparatus according to claim 2, further comprising a display unit configured to display the selected composition pattern,
- wherein the control unit changes a zoom speed in response to a change of a composition pattern being displayed on the display unit.

* * * * *